United States Patent
Zheng et al.

(10) Patent No.: US 11,057,163 B2
(45) Date of Patent: Jul. 6, 2021

(54) DATA TRANSMISSION METHOD AND RELATED DEVICE

(71) Applicant: Huawei Technologies Co., Ltd., Shenzhen (CN)

(72) Inventors: Juan Zheng, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 16/579,431

(22) Filed: Sep. 23, 2019

(65) Prior Publication Data
US 2020/0021403 A1 Jan. 16, 2020

Related U.S. Application Data

(63) Continuation of application No. PCT/CN2018/080275, filed on Mar. 23, 2018.

(30) Foreign Application Priority Data

Mar. 24, 2017 (CN) .......................... 201710184872.1

(51) Int. Cl.
*H04L 1/18* (2006.01)
*H04L 1/00* (2006.01)

(52) U.S. Cl.
CPC .......... *H04L 1/1819* (2013.01); *H04L 1/0061* (2013.01)

(58) Field of Classification Search
CPC ......... H04L 1/189; H04L 1/1819; H04L 1/08; H04L 1/0061
See application file for complete search history.

(56) References Cited

U.S. PATENT DOCUMENTS

| 5,386,420 A | * | 1/1995 | Blaum | .................. H04L 1/0052 |
| | | | | 714/700 |
| 5,828,677 A | * | 10/1998 | Sayeed | ................. H04L 1/0009 |
| | | | | 714/774 |
| 2004/0081248 A1 | * | 4/2004 | Parolari | ............... H04L 1/0003 |
| | | | | 375/259 |

(Continued)

FOREIGN PATENT DOCUMENTS

| CN | 101192878 A | 6/2008 |
| CN | 103378932 A | 10/2013 |

(Continued)

OTHER PUBLICATIONS

Sony, "Feedbacks for improving URLLC reliability", 3GPP TSG RAN WG1 Meeting #88, R1-1703123, Feb. 13-17, 2017, 4 pages, Athens, Greece.

(Continued)

*Primary Examiner* — Guy J Lamarre
(74) *Attorney, Agent, or Firm* — Slater Matsil, LLP

(57) ABSTRACT

In certain embodiments, a method includes repeatedly transmitting, by a first device, first data to a second device within a first time unit set. The first data is determined based on a first redundancy version and to-be-transmitted system bits. The first time unit set includes K time units, K≥3, and K is an integer. The method further includes when a first condition is met, stopping, by the first device, transmitting the first data in the $M^{th}$ time unit, where 2≤M≤K, and M is an integer.

20 Claims, 14 Drawing Sheets

(56) References Cited

U.S. PATENT DOCUMENTS

| | | | |
|---|---|---|---|
| 2008/0090517 A1 | 4/2008 | Cheng | |
| 2009/0262678 A1* | 10/2009 | Oyman | H04L 5/0035 370/315 |
| 2011/0055652 A1 | 3/2011 | Park | |
| 2011/0305213 A1* | 12/2011 | Lohr | H04L 1/1887 370/329 |
| 2016/0211949 A1 | 7/2016 | You et al. | |
| 2018/0109358 A1 | 4/2018 | Xing et al. | |
| 2019/0116606 A1* | 4/2019 | Chen | H04L 5/0044 |

FOREIGN PATENT DOCUMENTS

| | | |
|---|---|---|
| CN | 106160931 A | 11/2016 |
| EP | 2323303 A1 | 5/2011 |
| JP | 2016504798 A | 2/2016 |
| WO | 02065734 A1 | 8/2002 |
| WO | 2016161910 A1 | 10/2016 |

OTHER PUBLICATIONS

Huawei et al., "UL Grant-free transmission", 3GPP TSG RAN WG1 #88 R1-1701665, Athens, Greece, Feb. 13-17, 2017, pp. 2-17.

* cited by examiner

DATA TRANSMISSION METHOD AND RELATED DEVICE

CROSS-REFERENCE TO RELATED APPLICATIONS

This application is continuation application of International Application No. PCT/CN2018/080275, filed on Mar. 23, 2018, which claims priority to Chinese Patent Application No. 201710184872.1, filed on Mar. 24, 2017. The disclosures of the aforementioned applications are hereby incorporated by reference in their entireties.

TECHNICAL FIELD

This application relates to the field of wireless communications technologies, and in particular, to a data transmission method and a related device.

BACKGROUND

In a conventional LTE system, a hybrid automatic repeat request (HARQ) mechanism may be used to ensure data transmission reliability. Specifically, after a first device transmits data to a second device for the first time, the second device feeds back a HARQ-ACK for the data transmitted by the first device. The HARQ-ACK includes an acknowledgement (ACK) and a negative acknowledgement (NACK). When the first device receives the NACK, the first device needs to transmit the data to the second device again until the first device receives the ACK. When a conventional HARQ mechanism is used, data transmission reliability can be ensured, but a data transmission latency is increased. In other words, if the data transmitted by the first device for the first time is incorrectly received by the second device, the first device needs to transmit the data to the second device again until the first device receives an ACK fed back by the second device. In addition, it is possible that the first device can transmit the data to the second device again only after receiving scheduling information from the second device. Both receiving the scheduling information from the second device by the first device and a process of transmitting the data again increase a data transmission latency.

During discussion of a $5^{th}$ generation (5G) mobile communications standard, for an ultra-reliable and low latency communications (URLLC) scenario, to ensure both high reliability and a low latency of data transmission, when the first device has to-be-transmitted information bits, K times of repeated transmission (repetition) are allowed for the to-be-transmitted system bits. This manner can ensure a low data transmission latency while ensuring high data transmission reliability.

The first device does not directly transmit the to-be-transmitted system bits. Instead, the first device implements transmission of the system bits by transmitting data that includes some or all of the to-be-transmitted system bits. Specifically, the first device performs processing such as channel coding on the to-be-transmitted system bits to generate to-be-transmitted data. After performing channel coding on the to-be-transmitted system bits, the first device generates redundant bits corresponding to the to-be-transmitted system bits, and determines the to-be-transmitted data based on a redundancy version (RV) used by the first device. The data includes the system bits and/or the redundant bits. It can be learned that if the first device uses a different redundancy version, the generated to-be-transmitted data is different. In other words, a composition ratio of the system bits and/or the redundant bits included in the to-be-transmitted data is different. How to determine the data to be transmitted by the first device during the K times of repeated transmission is a subject actively researched by a person skilled in the art.

SUMMARY

Embodiments of this application provide a data transmission method and a related device, to determine, during K times of repeated transmission of system bits, data that is determined based on the system bits and that needs to be transmitted each time, and ensure high reliability and a low latency of data transmission.

According to a first aspect, a data transmission method is provided and applied to a first device. The method may include repeatedly transmitting, by the first device, first data to a second device within a first time unit set, where the first data is determined based on a first redundancy version and to-be-transmitted system bits, the first time unit set includes K time units, K≥3, and K is an integer. The method may also include, when a first condition is met, stopping, by the first device, transmitting the first data in the $M^{th}$ time unit, where 2≤M≤K, and M is an integer.

With reference to the first aspect, in some possible implementations, before the repeatedly transmitting, by the first device, first data to a second device within a first time unit set, the method further includes: when a second condition is met, determining, by the first device, to repeatedly transmit the first data, where the second condition includes: If the first device receives configuration information from the second device, the first device determines to repeatedly transmit the first data, where the configuration information is corresponding to a transmission resource of the first device; or if the first device determines that a transmission code rate used for transmitting the system bits is greater than a first threshold, the first device determines to repeatedly transmit the first data.

With reference to the first aspect, in some possible implementations, the transmission code rate is determined based on a quantity of the system bits, a quantity of occupied resources corresponding to the system bits, and a modulation scheme, and the first threshold is a code rate of channel coding corresponding to the system bits.

With reference to the first aspect, in some possible implementations, the first condition includes: The first device receives first feedback information that is intended for the first data and that is from the second device, where the first feedback information is used to indicate a reception status of the first data, and the reception status of the first data includes correct reception, incorrect reception, or reception; or a quantity of times the first device repeatedly transmits the first data to the second device reaches a second threshold.

With reference to the first aspect, in some possible implementations, the first condition includes: The first device receives first feedback information that is intended for the first data and that is from the second device, where the first feedback information is used to indicate a reception status of the first data, and the reception status of the first data includes incorrect reception or reception; or a quantity of times the first device repeatedly transmits the first data to the second device reaches a second threshold, where after the stopping, by the first device, transmitting the first data in the $M^{th}$ time unit, the method further includes: repeatedly transmitting, by the first device, the system bits to the second device within a second time unit set, where the second time unit set includes the $M^{th}$ time unit to the $K^{th}$ time unit.

With reference to the first aspect, in some possible implementations, the repeatedly transmitting, by the first device, the system bits to the second device within a second time unit set includes: repeatedly transmitting, by the first device, the system bits to the second device within the second time unit set until the first device receives, from the second device, second feedback information that is intended for the system bits; or repeatedly transmitting, by the first device, the system bits to the second device within the second time unit set until a quantity of times the first device repeatedly transmits the system bits to the second device reaches a third threshold.

With reference to the first aspect, in some possible implementations, the repeatedly transmitting, by the first device, the system bits to the second device within a second time unit set includes: transmitting, by the first device, second data in the $N^{th}$ time unit in the second time unit set, where the second data is determined based on a second redundancy version and the to-be-transmitted system bits, and N is a positive integer.

With reference to the first aspect, in some possible implementations, the repeatedly transmitting, by the first device, the system bits to the second device within a second time unit set includes: repeatedly transmitting, by the first device, the second data in the $N^{th}$ time unit to the $J^{th}$ time unit in the second time unit set, where N<J, and J is an integer.

According to a second aspect, a data transmission method is provided and applied to a second device. The method may include: receiving, by the second device within a first time unit set, first data repeatedly transmitted by a first device, where the first data is determined based on a first redundancy version and to-be-transmitted system bits, the first time unit set includes K time units, K≥3, and K is an integer. The method also includes, when a first condition is met, stopping, by the second device, receiving the first data in the $M^{th}$ time unit, where 2≤M≤K, and M is an integer.

With reference to the second aspect, in some possible implementations, before the receiving, by the second device within a first time unit set, first data repeatedly transmitted by a first device, the method further includes: sending, by the second device, configuration information to the first device, where the configuration information is used to instruct the first device to repeatedly transmit the first data.

With reference to the second aspect, in some possible implementations, the first condition includes: The second device sends feedback information that is intended for the first data to the first device, where the feedback information is used to indicate a reception status of the first data, and the reception status of the first data includes correct reception, incorrect reception, or reception; or a quantity of times the second device repeatedly receives the first data reaches a second threshold.

With reference to the second aspect, in some possible implementations, after the receiving, by the second device within a first time unit set, first data repeatedly transmitted by a first device, the method further includes: when confirming that the first data is received, sending, by the second device to the first device, the feedback information that is intended for the first data, where the feedback information is used to indicate that the first data is received.

With reference to the second aspect, in some possible implementations, the confirming, by the second device, that the first data is received includes: confirming, by the second device based on signature information of the first data, that the first data is received.

With reference to the second aspect, in some possible implementations, after confirming that the first data is received, the second device confirms that the first data is correctly received or is incorrectly received, and the second device sends the feedback information to the first device, where the feedback information is used to indicate that the first data is correctly received or is incorrectly received.

With reference to the second aspect, in some possible implementations, when the feedback information is used to indicate that the first data is incorrectly received or is used to indicate that the first data is received, or when the quantity of times the second device repeatedly receives the first data reaches the second threshold, the method includes: receiving, by the second device within a second time unit set, the system bits repeatedly transmitted by the first device, where the second time unit set is a time unit set that includes the $M^{th}$ time unit to the $K^{th}$ time unit.

With reference to the second aspect, in some possible implementations, the second device receives, within the second time unit set, the system bits repeatedly transmitted by the first device, where the second time unit set includes the $M^{th}$ time unit to the $K^{th}$ time unit.

With reference to the second aspect, in some possible implementations, the receiving, by the second device within a second time unit set, the system bits repeatedly transmitted by the first device includes: receiving, by the second device within the second time unit set, the system bits repeatedly transmitted by the first device, until the second device sends feedback information that is intended for the system bits to the first device, or until a quantity of times the second device repeatedly receives the system bits reaches a third threshold.

With reference to the second aspect, in some possible implementations, the receiving, by the second device within a second time unit set, the system bits repeatedly transmitted by the first device includes: receiving, by the second device, second data in the $N^{th}$ time unit in the second time unit set, where the second data is determined based on a second redundancy version and the system bits, and N is a positive integer.

With reference to the second aspect, in some possible implementations, the receiving, by the second device within a second time unit set, the system bits repeatedly transmitted by the first device includes: receiving, by the second device in the $N^{th}$ time unit to the $J^{th}$ time unit in the second time unit set, the second data repeatedly transmitted by the first device, where N<J, and J is an integer.

With reference to the first aspect and the second aspect, in some possible implementations, a quantity of times of repeatedly transmitting the first data is different from a quantity of times of repeatedly transmitting the second data.

With reference to the first aspect and the second aspect, in some possible implementations, the first redundancy version is the same as the second redundancy version, or the first redundancy version is different from the second redundancy version.

With reference to the first aspect and the second aspect, in some possible implementations, a version number of the first redundancy version is 0.

With reference to the first aspect and the second aspect, in some possible implementations, the quantity of times of repeatedly transmitting the second data is determined by the first device when the first device does not receive configuration information from the second device, where the configuration information is used to indicate the quantity of times of repeatedly transmitting the second data.

With reference to the first aspect and the second aspect, in some possible implementations, the third threshold is preconfigured based on received RRC signaling, broadcast signaling, or dynamic signaling, or the third threshold is determined by the first device based on a latency requirement of the to-be-transmitted system bits.

With reference to the first aspect and the second aspect, in some possible implementations, the signature information includes a demodulation reference signal or preamble information.

According to a third aspect, a data transmission method is provided and applied to a first device. The method may include: determining, by the first device, to-be-transmitted system bits and a first time unit; determining, by the first device based on the first time unit, a redundancy version corresponding to the first time unit. The method also includes determining, by the first device, first data based on the redundancy version and the to-be-transmitted system bits; and transmitting, by the first device, the first data to the second device in the first time unit.

According to a fourth aspect, a data transmission method is provided and applied to a second device. The method may include: receiving, by the second device in a first time unit, first data transmitted by a first device. The method also includes determining, by the second device based on the first time unit, a redundancy version corresponding to the first time unit. The method also includes processing, by the second device, the first data based on the redundancy version.

With reference to the third aspect and the fourth aspect, in some possible implementations, the determining, based on the first time unit, a redundancy version corresponding to the first time unit includes: determining, based on an index number of the first time unit, the redundancy version corresponding to the first time unit.

According to a fifth aspect, a first device is provided, and a functional unit included in the first device is configured to perform a part of the method or the entire method in the first aspect.

According to a sixth aspect, a second device is provided, and a functional unit included in the second device is configured to perform a part of the method or the entire method in the second aspect.

According to a seventh aspect, a first device is provided, and a functional unit included in the first device is configured to perform a part of the method or the entire method in the third aspect.

According to an eighth aspect, a second device is provided, and a functional unit included in the second device is configured to perform a part of the method or the entire method in the fourth aspect.

According to a ninth aspect, a first device is provided, including a memory, a processor, and a computer program that is stored in the memory and that can be executed by the processor, where the processor executes the computer program to perform steps of the data transmission method in the first aspect.

According to a tenth aspect, a second device is provided, including a memory, a processor, and a computer program that is stored in the memory and that can be executed by the processor, where the processor executes the computer program to perform steps of the data transmission method in the second aspect.

According to an eleventh aspect, a first device is provided, including a memory, a processor, and a computer program that is stored in the memory and that can be executed by the processor, where the processor executes the computer program to perform steps of the data transmission method in the third aspect.

According to a twelfth aspect, a second device is provided, including a memory, a processor, and a computer program that is stored in the memory and that can be executed by the processor, where the processor executes the computer program to perform steps of the data transmission method in the fourth aspect.

In the embodiments of this application, the first device repeatedly transmits the first data to the second device within the first time unit set; and when the first condition is met, stops transmitting the first data in the $M^{th}$ time unit. In this way, during K times of repeated transmission of the system bits, data that is determined based on the system bits and that needs to be transmitted can be determined, and high reliability and a low latency of data transmission are ensured.

BRIEF DESCRIPTION OF THE DRAWINGS

To describe technical solutions in embodiments of this application or in the background more clearly, the following describes accompanying drawings required for describing the embodiments of this application or the background.

DETAILED DESCRIPTION OF ILLUSTRATIVE EMBODIMENTS

Terms used in the embodiments of this application are merely used to explain specific embodiments of this application, but are not intended to limit this application.

For ease of understanding of the embodiments of this application, a wireless communications system and a related application scenario in the embodiments of this application are first described.

Figure 1:
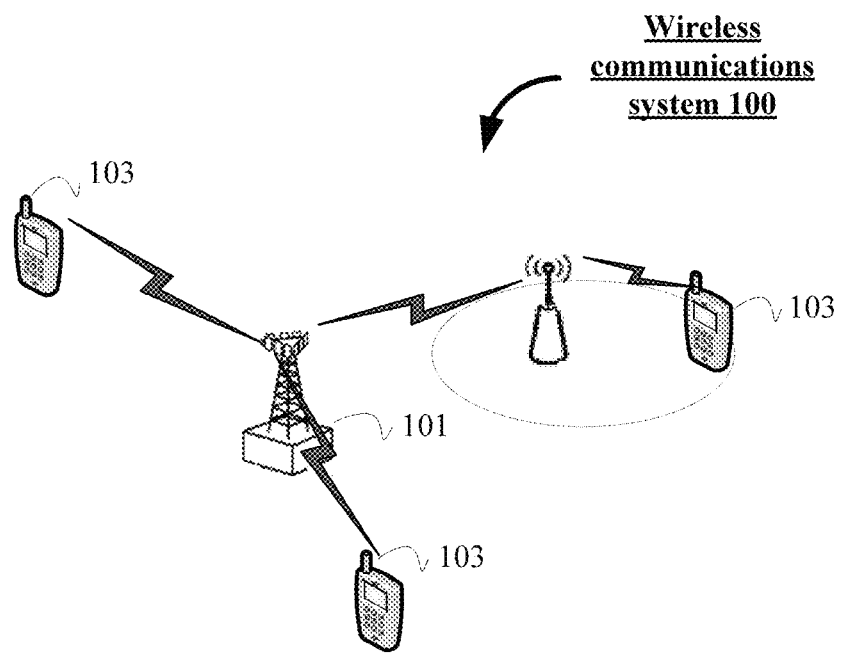
FIG. 1 is a schematic architectural diagram of a wireless communications system according to an embodiment of this application.

FIG. 1 shows a wireless communications system 100 in this application. The wireless communications system includes a base station 101 and user equipment 103.

In some embodiments of this application, the base station 101 may include a base transceiver station, a wireless transceiver, one basic service set (BSS), one extended service set (ESS), a NodeB, an eNodeB, a HeNodeB, a relay, a femto, a pico, or a base station device that uses a 5G technology standard, for example, a gNodeB (gNB). The wireless communications system 100 may include different types of base stations 101, for example, a macro base station and a micro base station. The base station 101 may use different radio technologies, for example, a cell radio access technology or a WLAN radio access technology.

The user equipment 103 may be distributed throughout the wireless communications system 100, and may be stationary or mobile. In some embodiments of this application, the user equipment 103 may include a mobile device, a mobile station, a mobile unit, a radio unit, a remote unit, a user agent, a mobile client, a relay, user equipment that uses a 5G technology standard, or the like.

Data transmission can be implemented between the base station 101 and the user equipment 103 through a radio access network (RAN).

For some embodiments in this application, a first device may be a base station, and correspondingly, a second device may be user equipment. Alternatively, for still other embodiments in this application, a first device may be user equipment, and correspondingly, a second device may be a base station. Herein, this is not specifically limited in this application.

Based on the wireless communications system shown in FIG. 1, the following briefly describes a manner of repeatedly transmitting system bits by a first device disclosed in this application.

The first device may first determine to-be-transmitted system bits. The system bits described in this application may be a transport block (TB) or a code block (CB). Alternatively, a size of the system bits (that is, a quantity of the system bits) described in this application may be a transport block size (TBS). For example, if the quantity of the system bits is z, content of the system bits may be expressed in a form of $X(z-1)X(z-2)X(z-3) \ldots X(0)$, where $X(i)$ represents a system bit, a value of $X(i)$ is 0 or 1, $0 \leq i \leq z-1$, i is an integer, $X(z-1)$ represents a most significant bit (MSB), and $X(0)$ represents a least significant bit (LSB). Determining the to-be-transmitted system bits includes determining the size (or the quantity) of the to-be-transmitted system bits and/or the content of the system bits.

The first device may determine the size of the to-be-transmitted system bits in at least the following manners.

(1) The first device determines the size of the to-be-transmitted system bits based on a grant free transmission resource. The transmission resource includes at least one of a time domain resource, a frequency domain resource, or a codebook. It may be understood that in this manner, the size of the to-be-transmitted system bits may be corresponding to different transmission resources. For example, assuming that the transmission resource includes N different time-frequency resources, and the N different time-frequency resources are respectively represented by a time-frequency resource #1, a time-frequency resource #2, . . . , and a time-frequency resource #N, the time-frequency resource #1, the time-frequency resource #2, . . . , and the time-frequency resource #N may be corresponding to a system bit size #1 (for example, 100 bits), a system bit size #2 (for example, 500 bits), . . . , and a system bit size #N (for example, 1000 bits), respectively. The grant free transmission resource may be pre-configured by a second device; and/or may be notified of by the second device by using dynamic signaling; or may be selected by the first device based on event driving; or may be pre-defined. In this application, a pre-configuration manner includes performing configuration by the second device by using radio resource control (RRC) signaling. An example in which the first device is UE is used. The RRC signaling may be UE dedicated signaling (that is, valid only for single UE), or user group signaling (that is, valid for all UEs included in a user group), or the RRC signaling may be broadcast signaling. The dynamic signaling includes physical layer signaling. In other words, the grant free transmission resource may be notified of by using control information borne by a physical layer downlink control channel. In this embodiment of the present invention, the physical layer downlink control channel may include a physical downlink control channel (PDCCH), an enhanced physical downlink control channel (EPDCCH), or another physical downlink channel, for example, a downlink channel used in a $5^{th}$ generation communications technology standard. This is not specifically limited herein. It should be noted that when the grant free transmission resource is pre-configured by the second device, and notified of by the second device by using the dynamic signaling, an implementation is that the second device may pre-configure a plurality of grant free transmission resources, and then notify, by using the dynamic signaling, the first device of a grant free transmission resource to be used specifically. That the first device performs selection based on event driving means that, for example, the first device determines, based on a service transmission requirement, a grant free transmission resource used for transmitting the system bits. It should be noted that the foregoing descriptions of pre-configuration and the dynamic signaling are also applicable to another implementation part in this application.

(2) The first device determines the size of the to-be-transmitted system bits based on scheduling information sent by a second device. In this manner, the scheduling information may be notified of by using physical layer signaling, for example, may be borne in a physical layer downlink control channel, or may be notified of by using RRC signaling. For explanations of the physical layer signaling and the RRC signaling, refer to manner (1). Details are not described herein again. The scheduling information may directly indicate the size of the to-be-transmitted system bits, or indirectly indicate the size of the to-be-transmitted system bits. A manner of indirectly indicating the size of the to-be-transmitted system bits by using the scheduling information is that the scheduling information may indicate a modulation and coding scheme (MCS) and a size of an allocated resource block (RB). The first device determines the size of the to-be-transmitted system bits based on the MCS and an RB size. In a 5G communications technology, the allocated resource block may also be represented by using another parameter, and mainly represents a time-frequency resource used for transmitting the system bits.

(3) The first device determines the size of the to-be-transmitted system bits based on an actual transmission requirement.

The first device may alternatively determine the size of the to-be-transmitted system bits in another manner. This is not limited herein.

On the other hand, the first device may determine content of the to-be-transmitted system bits based on an actual transmission requirement, for example, actual transmission content.

After determining the to-be-transmitted system bits, the first device needs to process the to-be-transmitted system bits before transmitting the to-be-transmitted system bits, for example, add a CRC check bit (may also be referred to as a parity check bit (Parity bit(s))) and perform channel coding on the system bits. Channel coding may use a turbo code, a tail biting convolutional code, a polar code, and a low-density parity-check code (LDPC code), or may include coding in another form. This is not specifically limited herein.

An example in which channel coding uses a turbo code is used to explain and describe a channel coding process of the to-be-transmitted system bits.

Figure 2:
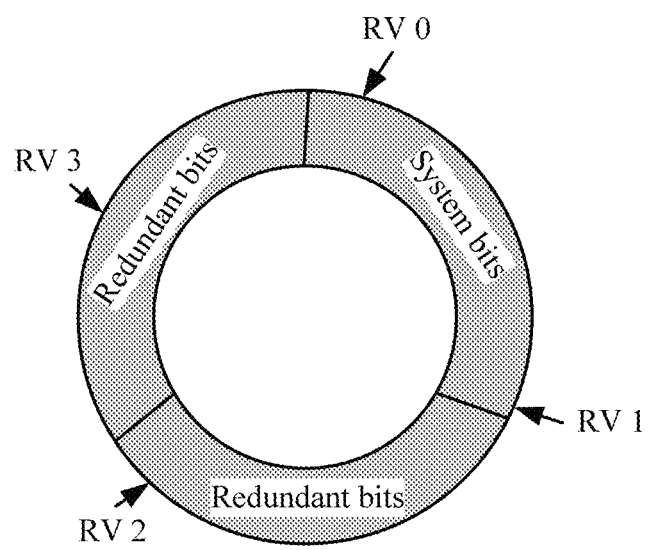
FIG. 2 is a schematic diagram of a buffer for turbo coding disclosed in an embodiment of this application.

FIG. 2 shows a manner of performing turbo coding on to-be-transmitted system bits disclosed in this application. As shown in FIG. 2, it is assumed that there are P to-be-transmitted system bits. After turbo coding with a code rate of 1/3 is performed on the to-be-transmitted system bits, channel coded data of 3P bits is generated. The channel coded data includes P system bits and 2P redundant bits.

In this embodiment of this application, after channel coding is performed, a first device determines, based on a size of an actual data transmission resource, a quantity of bits that should be selected from the channel coded data of 3P bits for transmission. A specific selection process may be: The channel coded data of 3P bits is sequentially placed in a buffer according to a preset rule. It should be noted that in this embodiment of this application, the buffer is used only for ease of description of different channel coded data corresponding to different redundancy versions, and does not mean that there is definitely a buffer on a first device side. In other words, on the first device side, an apparatus of the first device may include the buffer, or may not include the buffer. This is not specifically limited herein. For ease of description of start points of the channel coded data corresponding to different redundancy versions, it is assumed in FIG. 2 that the buffer is a circular buffer. A redundancy version is used to indicate a start location at which data is fetched from the circular buffer. For example, as shown in FIG. 2, four currently supported redundancy versions are an RV 0, an RV 1, an RV 2, and an RV 3. For data fetching start locations indicated by the redundancy versions, refer to locations indicated by arrows in the figure. Because data fetching start locations indicated by different redundancy versions are different, data corresponding to different redundancy versions are different. A quantity of bits of channel coded data fetched from the circular buffer may be related to the size of the actual data transmission resource. Optionally, the size of the actual data transmission resource is related to a time-frequency resource size and an MCS that are used for actual data transmission, or related to a time-frequency resource size and a modulation scheme that are used for actual data transmission, or more generally, related to a quantity of bits that can be borne by the actual data transmission resource. Herein, actually transmitted data is data borne on a time-frequency resource that is used by the first device for transmitting the channel coded data. For example, assuming that the first device uses X RBs to transmit data, data borne on the X RBs may be considered as the actually transmitted data. It should be noted that the time-frequency resource includes a time resource and a frequency resource. The modulation scheme includes but is not limited to BPSK, QPSK, 16QAM, 64QAM, 256QAM, and 1024QAM. In this embodiment of the present invention, a specific amount of channel coded data is selected from the buffer constituted by the channel coded data, so that the selected channel coded data can be adapted to a time-frequency resource that is used for transmitting the system bits. This adaptation process may be considered as a rate matching process. It may be understood that a time-frequency resource used for transmitting data obtained through processing performed on the system bits (the processing includes at least one of the following: CRC adding, channel coding, rate matching, channel interleaving, code block segmentation, code block concatenation, scrambling, modulation, layer mapping, precoding, resource element mapping, or output symbol generation) is a time-frequency resource used for transmitting the system bits in this embodiment of the present invention.

Data determined after the first device performs processing on the to-be-transmitted system bits is to-be-transmitted data. In this embodiment of this application, the performing, by the first device, processing on the to-be-transmitted system bits includes at least converting, through the processing, the to-be-transmitted system bits into data borne on a time-frequency resource used for actual data transmission. For example, it is assumed that a size of the to-be-transmitted system bits is L bits, and the time-frequency resource used for actual data transmission can bear J bits. The first device performs processing on the to-be-transmitted system bits, including processing on the L bits, to obtain J bits, where L and J are integers. Optionally, CRC adding, channel coding, and rate matching that are performed by the first device on the to-be-transmitted system bits may be considered as a process of performing processing on the to-be-transmitted system bits. Alternatively, more generally, as described above, the process of performing processing on the to-be-transmitted system bits includes at least one of the following: CRC adding, channel coding, rate matching, channel interleaving, code block segmentation, code block concatenation, scrambling, modulation, layer mapping, precoding, resource element mapping, or output symbol generation.

It may be understood that the first device determines different to-be-transmitted data for same to-be-transmitted system bits based on different redundancy versions. Content actually transmitted by the first device to a second device is system bits, and system bits corresponding to different data are the same.

After the first device determines the to-be-transmitted data corresponding to the to-be-transmitted system bits, the first device transmits data for K times within a first time unit set. Data transmitted each time is determined based on the same to-be-transmitted system bits. Therefore, it may be considered that the first device repeatedly transmits the to-be-transmitted system bits for K times within the first time unit set.

The first time unit set includes K time units. Data is transmitted once in each time unit. In this embodiment of this application, K is an integer greater than or equal to 3.-

The time unit described in this embodiment of this application may be expressed as a transmission time interval (TTI). The TTI may be used as a minimum time unit of data transmission, or as a minimum time unit of data scheduling. A time length of the TTI is 1 millisecond or 0.5 milliseconds. Alternatively, one TTI may be expressed as an integer quantity of orthogonal frequency division multiplexing (OFDM) symbols. For example, each TTI is expressed as one or two OFDM symbols.

The K time units included in the first time unit set may be K consecutive time units, or may be K inconsecutive time units. Time sequences of consecutive time units are continuous in time domain, and no other time units exist between two time units. Time sequences of inconsecutive time units may be discontinuous in time domain, or in other words, another time unit that is not included in the first time unit set may exist between two time units. For details, refer to FIG. 3A to FIG. 3C.

It should be noted herein that time sequences of time units in a first time unit set in an accompanying drawing in this application are from left to right. In other words, a leftmost time unit sequence is the first time unit.

Figure 3A:
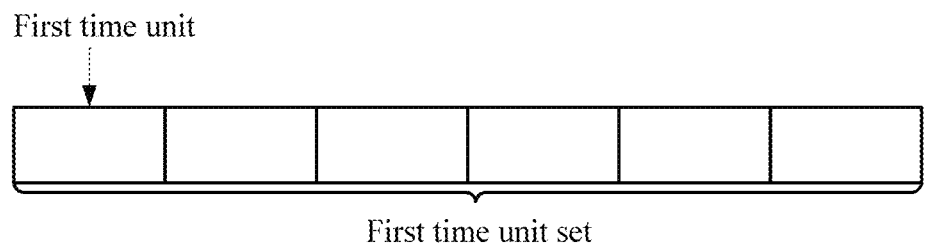
FIG. 3A to FIG. 3C are schematic composition diagrams of time units in a first time unit set disclosed in an embodiment of this application.

FIG. 3A shows that a first time unit set includes six consecutive time units. In the six consecutive time units, data including system bits is transmitted once in each time unit. In other words, the system bits are repeatedly transmitted for six times respectively in the six consecutive time units. Because redundancy versions based on which data is determined may be different, data transmitted in the six time units may be the same, or may be different.

Figure 3B:
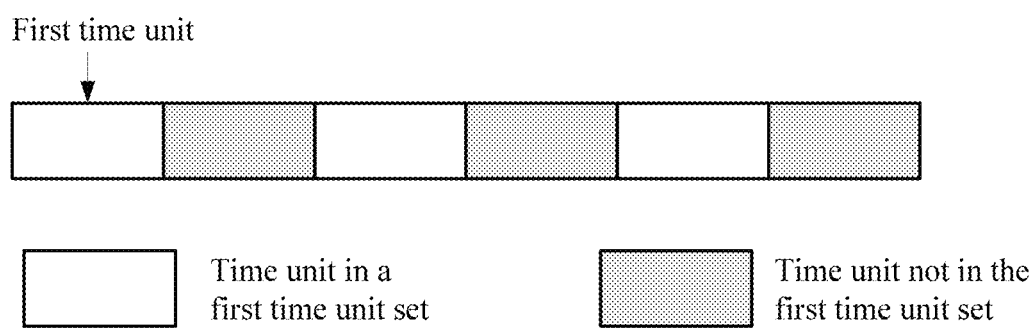
Figure 3C:
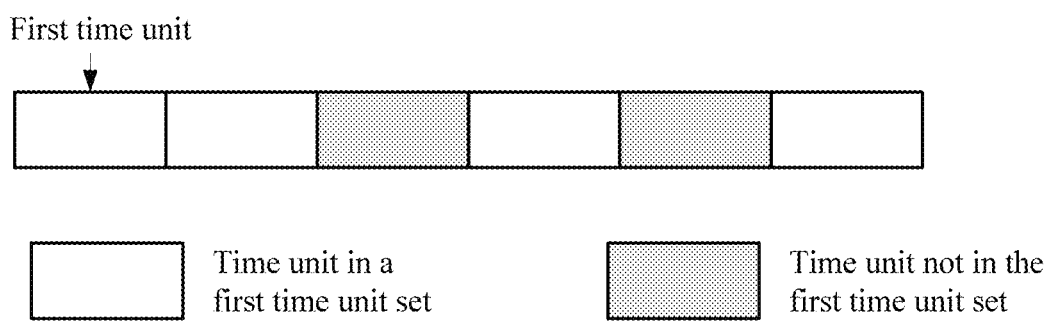

FIG. 3B and FIG. 3C show that a first time unit set includes three (corresponding to FIG. 3B) and four (corresponding to FIG. 3C) inconsecutive time units. For example, in a time division duplex (TDD) system, due to a subframe configuration, time units in a first time unit set may be inconsecutive. For another example, for data transmission of a plurality of HARQ processes, time units in a first time unit set are also inconsecutive. For example, in FIG. 3B, data of a HARQ process with a process number (ID) being 0 is transmitted in the first time unit set. In FIG. 3B, the data of the HARQ process with the process number being 0 is transmitted in the first time unit, and data of a HARQ process with another process number (for example, 1) is transmitted in the second time unit. In addition, system bits corresponding to the HARQ process with the process number being 0 are different from system bits corresponding to the HARQ process with the process number being 1. Herein, the three inconsecutive time units mean that at least one of the three time units is inconsecutive to other time units. The following cases are included: Each time unit is inconsecutive to other time units, as shown in FIG. 3B; and two or more than two time units are consecutive, and at least one time unit is inconsecutive to other time units, as shown in FIG. 3C.

It should be noted that time lengths that are used for transmitting data and that are in the time units in the first time unit set may be the same, or may be different. This is not specifically limited herein.

In the foregoing manner, K times of repeated transmission of the system bits can be implemented. However, how to determine, during the K times of repeated transmission of the system bits, data that is determined based on the system bits and that needs to be transmitted each time is a technical problem to be resolved by this application.

With reference to the foregoing embodiments, the following describes method embodiments disclosed in this application.

Figure 4:
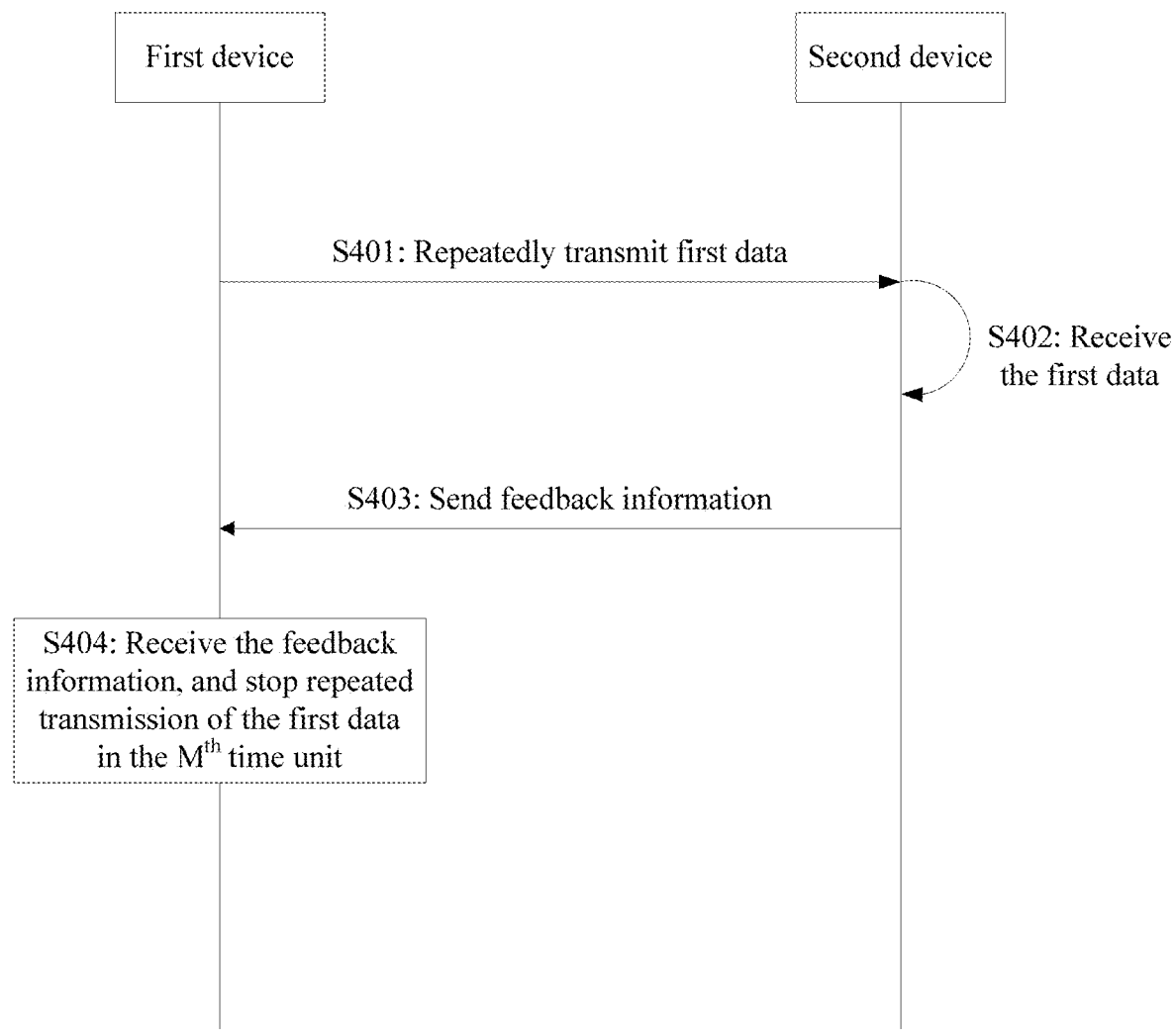
FIG. 4 is a schematic flowchart of a data transmission method disclosed in an embodiment of this application.

FIG. 4 is a schematic flowchart of a data transmission method according to an embodiment of this application. As shown in FIG. 4, the method includes the following steps.

Step S401: A first device repeatedly transmits first data to a second device within a first time unit set, where the first data is determined based on a first redundancy version and to-be-transmitted system bits, the first time unit set includes K time units, K≥3, and K is an integer.

In some possible implementations, the first device may repeatedly transmit the first data to the second device from any time unit in the first time unit set. Preferably, the first device may repeatedly transmit the first data from the first time unit in the first time unit set. The first data is determined based on an RV 0 and the to-be-transmitted system bits.

It should be noted that repeated data transmission described in this application means that data transmitted in all times of transmission is the same. In other words, redundancy versions corresponding to the data transmitted in all the times of transmission are the same, and system bits corresponding to the data transmitted in all the times of transmission are the same. Repeated data transmission is actually a specific implementation of repeated system bit transmission. Repeated system bit transmission described in this application means that: During the repeated transmission, system bits corresponding to data transmitted each time are the same as system bits corresponding to data transmitted in all other times of transmission, but redundancy versions corresponding to the data transmitted in all the times of transmission may be the same or different. In other words, the data transmitted in all the times of transmission may be the same or different.

Repeated data transmission described in this application means that before receiving a feedback intended for the repeatedly transmitted data, the first device does not stop transmitting the data; and/or before a quantity of times the data is transmitted reaches a maximum quantity of times of repeated transmission, the first device does not stop transmitting the data. In this application, the feedback intended for the repeatedly transmitted data includes acknowledgement information or negative acknowledgement information that is corresponding to the data, or another feedback information. The another feedback information herein may include control information used for scheduling the system bits corresponding to the data, or may include information used to indicate that the data is received. Repeated system bit transmission described in this application may also be understood as repeated TB or CB transmission. Repeated system bit transmission means that before receiving a feedback that is intended for the system bits and that is from the second device, the first device does not stop transmitting the system bits; and/or before a quantity of times the system bits are transmitted reaches a maximum quantity of times of repeated transmission, the first device does not stop transmitting the system bits. In this application, the feedback intended for the system bits includes acknowledgement information or negative acknowledgement information that is corresponding to the system bits, or another feedback information. The another feedback information herein may include control information used for scheduling the system bits.

It should be noted that in this application, within a time range of repeated system bit transmission, the first data determined based on the system bits and the first redundancy version may be repeatedly transmitted. In this scenario, if feedback information corresponding to the data is received, repeated transmission of the system bits corresponding to the data may not be affected, or it may be understood that repeated transmission of the system bits corresponding to the data may continue within the foregoing time range.

A start point of the first time unit set, or a location, in time, of the first time unit included in the first time unit set, may be determined by the first device based on a data transmission requirement, or indicated by the second device, or pre-configured or pre-defined, or may be determined in another manner. This is not specifically limited herein. For example, when the first device has a service transmission requirement or has to-be-transmitted system bits, it may be understood that the first device requires a specific period of processing time to convert the system bits into data that can be transmitted. In this case, the location, in time, of the first time unit included in the first time unit set may be a time unit that is closest to a time at which the first device can transmit the system bits after the first device is ready to transmit the system bits. For example, assuming that the first device has to-be-transmitted system bits in the # $m^{th}$ time unit, and the first device requires two time units for completing processing of the system bits, that is, processing the system bits to obtain data that can be transmitted, the first device can transmit the system bits from the #$(m+3)^{th}$ time unit at the earliest. Based on this, the #$(m+3)^{th}$ time unit may be considered as the first time unit included in the first time unit set. If the start point of the first time unit set, or the location, in time, of the first time unit included in the first time unit set is indicated by the second device, dynamic signaling, and/or RRC signaling, and/or broadcast signaling may be used for notification.

A quantity (that is, K) of time units included in the first time unit set may be pre-configured. For example, the second device configures that the first device may perform K times of repeated transmission when transmitting same system bits. Alternatively, a quantity of time units included in the first time unit set may be selected by the first device. In other words, the first device determines a quantity of times of repeatedly transmitting same system bits. Alternatively, K may be notified of by the second device by using dynamic signaling.

In some possible implementations, the second device may pre-configure that the first device repeatedly transmits the first data; or the first device performs repeated transmission of the first data based on event driving. The second device may pre-configure a start time of repeatedly transmitting the first data; or the first device determines, based on event driving, a start time of repeatedly transmitting the first data. The second device may send scheduling information to the first device, and the scheduling information is used to indicate a transmission resource used by the first device for repeatedly transmitting the first data; or the first device implements repeated transmission of the first data by selecting an available grant free resource.

Optionally, when a specific condition is met, the first device determines to repeatedly transmit the first data within the first time unit set. The condition may include at least any one of the following conditions:

(1) The second device sends configuration information to the first device. The configuration information is used to instruct the first device to repeatedly transmit the first data. Optionally, the configuration information may be corresponding to a transmission resource of the first device. For example, an example in which the first device is user equipment is used. In an application scenario of uplink grant free transmission, while configuring an uplink grant free transmission resource for the user equipment, a base station may configure whether the first data needs to be repeatedly transmitted. Optionally, the base station may further configure a redundancy version corresponding to the first data. If the base station configures at least two sets of uplink grant free transmission resources for the user equipment, one grant free transmission resource is corresponding to one piece of configuration information, or a plurality of grant free transmission resources are corresponding to one piece of configuration information. For example, when the user equipment uses a grant free transmission resource A, obtained configuration information is configuration information A; and when the user equipment uses a grant free transmission resource B, obtained configuration information is configuration information B. For another example, when the user equipment uses a grant free transmission resource C or a grant free transmission resource D, obtained configuration information is configuration information C; and when the user equipment uses a grant free transmission resource E or a grant free transmission resource F, obtained configuration information is configuration information D. Certainly, the second device may alternatively use another configuration manner for the first device. This is not specifically limited herein. In this application, the configuration information may be notified of by using dynamic signaling, and/or RRC signaling, and/or higher layer broadcast signaling, or may be pre-defined. It may be understood that whether to repeatedly transmit the first data may be understood as a transmission mode used when the first device sends the to-be-transmitted system bits, and may be irrelevant to a specific time unit set. Therefore, the configuration information may be used only to instruct the first device to repeatedly transmit the first data. As for how the first device determines the first time unit included in the first time unit set and the quantity of the time units included in the first time unit set, refer to the foregoing description, and details are not described herein again.

(2) If determining that a transmission code rate used for transmitting the to-be-transmitted system bits is greater than a first threshold, the first device determines to repeatedly transmit the first data.

The transmission code rate used by the first device for transmitting the to-be-transmitted system bits is determined based on a quantity of the to-be-transmitted system bits, a quantity of transmission resources corresponding to the to-be-transmitted system bits, and a modulation scheme. Alternatively, the transmission code rate is determined based on a quantity of the to-be-transmitted system bits and a quantity of bits that can be borne by transmission resources corresponding to the to-be-transmitted system bits. For example, assuming that the quantity of the to-be-transmitted system bits is H, and the transmission resources corresponding to the to-be-transmitted system bits include I resource elements (Resource Element, RE), and assuming that a modulation order corresponding to a modulation scheme used for transmitting the to-be-transmitted system bits is J, the quantity of the bits that can be borne by the transmission resources corresponding to the to-be-transmitted system bits is I×J, and the transmission code rate used by the first device for transmitting the to-be-transmitted system bits is H/(I×J). For a correspondence between a modulation scheme and a modulation order, refer to Table 1. The foregoing uses an RE as an example to represent a unit of a minimum time-frequency resource that bears one modulation symbol. However, the unit of the minimum time-frequency resource that bears one modulation symbol is not limited thereto.

TABLE 1

Table of a correspondence between a modulation
scheme and a modulation order

| Modulation scheme | Modulation order |
|---|---|
| QPSK | 2 |
| 16QAM | 4 |
| 64QAM | 6 |
| 256QAM | 8 |
| 512QAM | 9 |
| 1024QAM | 10 |

The first threshold may be a code rate of channel coding corresponding to the to-be-transmitted system bits.

The following uses an example in which channel coding uses a turbo code, to describe the foregoing condition.

Assuming that channel coding uses the turbo code, and a code rate of channel coding is 1/3, it may be determined that the first threshold is 1/3. Assuming that there are 1000 (1 k) to-be-transmitted system bits, the transmission resources corresponding to the system bits include 1000 (1 k) REs, and a modulation scheme used for processing the system bits is 16QAM, it is determined according to Table 1 that a modulation order corresponding to 16QAM is 4. Based on the foregoing data, it can be determined that the transmission code rate of the to-be-transmitted system bits is 1/4. In other words, the transmission resources corresponding to the to-be-transmitted system bits may bear data of 4 k bits. In addition, when there are 1 k to-be-transmitted system bits, the circular buffer shown in FIG. 2 includes 1 k to-be-transmitted system bits and 2 k redundant bits. When determining that to-be-transmitted data is of 4 k bits, the first device fetches data of 4 k bits from the circular buffer. If the data of 4 k bits can include all the to-be-transmitted system bits, the first device does not need to determine a redundancy version of data that is to be repeatedly transmitted. In other words, when the transmission code rate corresponding to the to-be-transmitted system bits is less than or equal to the first threshold, to-be-transmitted system bits corresponding to all redundancy versions are of a same quantity, and include all the to-be-transmitted system bits. In this case, the first data corresponding to the first redundancy version does not need to be repeatedly transmitted. When the transmission code rate corresponding to the to-be-transmitted system bits is greater than the first threshold, for example, in a case of turbo coding, all bits cannot be fetched from the circular buffer. In this case, a start location corresponding to a redundancy version can determine a quantity of system bits included in data that is fetched based on each redundancy version. In this application, it can be determined that the first redundancy version is a redundancy version corresponding to data that can include a largest quantity of system bits.

For example, it is assumed that the first device is user equipment. In an application scenario of uplink grant free transmission, if both an uplink grant free transmission resource and the quantity of the to-be-transmitted system bits are pre-configured by a base station, the transmission code rate that is used for transmitting the to-be-transmitted system bits and that is determined by the user equipment may be determined based on the pre-configured quantity of the system bits, a resource quantity (for example, an RE quantity) of the uplink grant free transmission resource, and a modulation scheme. Alternatively, the transmission code rate may be pre-configured by a base station. Alternatively, the transmission code rate may be pre-defined by the user equipment. This is not specifically limited herein.

In this application, alternatively, the first threshold may be directly configured by the second device. The second device may configure the first threshold by using dynamic signaling and/or higher layer signaling (for example, RRC signaling or broadcast signaling).

More generally, in this application, if the first device determines that quantities of system bits included in different transmission data that is determined based on different redundancy versions and the system bits are basically the same during repeated transmission of the system bits, the first device may determine that the first data does not need to be repeatedly transmitted; otherwise, the first device may determine to repeatedly transmit the first data.

The first device repeatedly transmits the first data, and the first data is corresponding to the first redundancy version. Therefore, regardless of whether the second device can correctly receive the first data, a probability that the second device misses detection of the first data can be reduced. The second device receives the first data that includes more system bits. This is more helpful for the second device to correctly receive the to-be-transmitted system bits, thereby further reducing a data transmission latency.

Step S402: The second device receives the first data.

In some possible implementations, the second device confirms, based on signature information of the first data, that the first data is received. The signature information of the first data may include a demodulation reference signal (DMRS), a preamble, or the like that is corresponding to the first data. Herein, if DMRSs corresponding to the first data and other data are used to distinguish the first data from the other data, the distinguishing is implemented based on that time resources and/or frequency resources occupied by the DMRSs are different, or that sequence forms of the DMRSs are different. Herein, the other data is data that is determined based on another redundancy version and the to-be-transmitted system bits. In other words, a difference between the first data and the other data is that the first data and the other data are corresponding to different redundancy versions, but the first data and the other data are corresponding to the same to-be-transmitted system bits. For example, the time resources and/or the frequency resources occupied by the DMRSs corresponding to the first data and the other data are different, or the sequence forms of the DMRSs corresponding to the first data and the other data may be different, so as to distinguish the first data from the other data. It may be understood that when the time resources and/or the frequency resources occupied by the DMRSs corresponding to the first data and the other data are different, and the DMRSs are related to time-frequency resource locations used for transmitting data, time-frequency resources used for transmitting the first data and transmitting the other data are different.

Optionally, after receiving the first data, the second device may further parse the first data and generate a reception result. The reception result includes correct reception or incorrect reception.

Step S403: The second device sends feedback information to the first device, where the feedback information is used to indicate a status of receiving the first data by the second device.

In some possible implementations, the second device may send the feedback information immediately after confirming that the first data is received, where the feedback information is used to indicate that the first data is received; or the second device sends the feedback information after parsing the first data, where the feedback information is used to indicate that the first data is correctly received (ACK) or the first data is incorrectly received (NACK).

That the second device sends the feedback information immediately after confirming that the first data is received can further reduce a data transmission latency, and enables the first device to prepare transmission of the other data as early as possible. For example, if a redundancy version corresponding to the first data is the RV 0, that the second device sends the feedback information immediately after receiving the first data enables the first device to determine the other data based on the another redundancy version. Transmission of the other data can provide a higher redundancy coding gain for the second device to receive the system bits, thereby improving data transmission reliability.

It may be understood that the second device sends the feedback information to the first device, and the feedback information is used to indicate a reception status of the second device. The reception status includes reception, correct reception, or incorrect reception.

In some possible implementations, a specific form of the feedback information may be that an acknowledgement (ACK) indicates correct reception and that a negative acknowledgement (NACK) indicates incorrect reception, or the feedback information may be indicated by a new data indicator (NDI). For example, an NDI value may be used to represent an ACK or an NACK, or whether an NDI value is inverted may represent an ACK or an NACK. The feedback information may be alternatively expressed in another form. This is not specifically limited herein.

In some possible implementations, the second device may transmit the feedback information through a physical hybrid ARQ indicator channel (PHICH), a physical downlink control channel (PDCCH), an enhanced physical downlink control channel (EPDCCH), or another downlink channel, for example, a downlink channel used in $5^{th}$ generation communication. This is not specifically limited herein. Preferably, the feedback information does not include scheduling information that is intended for the system bits and that is from the second device. For example, the feedback information includes only an acknowledgement, or a negative acknowledgement, or a response to reception of the system bits.

Step S404: The first device receives the feedback information, and stops repeated transmission of the first data in the $M^{th}$ time unit.

In some possible implementations, the first device needs to process the feedback information after receiving the feedback information in a current time unit, and therefore the first device stops transmitting the first data in a next time unit. Herein, M is a number of a time unit in the first time unit set. A number of the first time unit in the first time unit set is 1.

Optionally, the first device may repeatedly transmit the first data from the first time unit in the first time unit set, or may repeatedly transmit the first data from a specified time unit in the first time unit set. A time interval between the specified time unit and the first time unit may be preconfigured, or determined in another manner. This is not specifically limited herein.

It can be learned that the first device repeatedly transmits the first data within the first time unit set, where the first data is determined based on the first redundancy version and the to-be-transmitted system bits, thereby improving a probability that the second device receives the first data; and when a first condition is met, the first device may stop repeated transmission of the first data. The foregoing method can ensure high reliability and a low latency of data transmission.

With reference to accompanying drawings, the following describes an implementation of repeatedly transmitting first data by a first device.

Figure 5A:
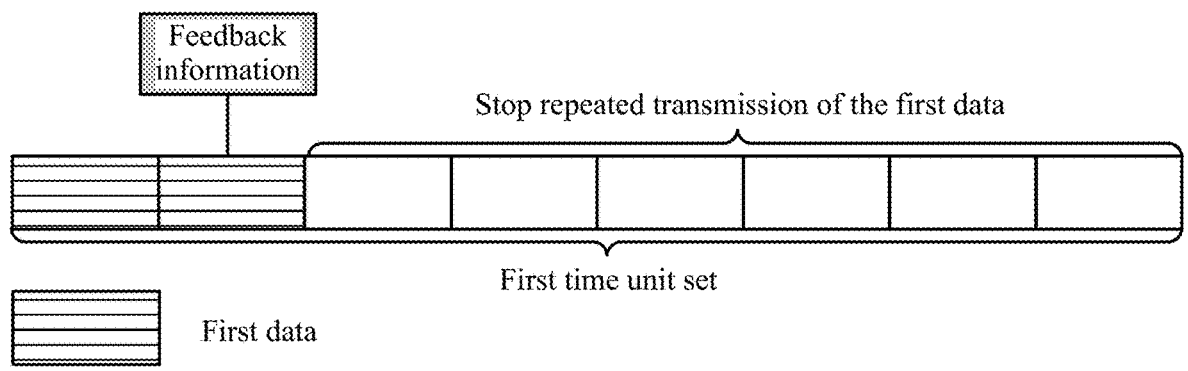
FIG. 5A is a schematic timing diagram of a first embodiment of repeatedly transmitting first data disclosed in an embodiment of this application.

FIG. 5A is a schematic timing diagram of a first embodiment of repeatedly transmitting first data disclosed in an embodiment of this application. As shown in FIG. 5A, an example in which a first time unit set includes consecutive time units is used. Herein, the first time unit set includes eight time units, that is, K is 8. The first device repeatedly transmits the first data from the first time unit. After the first data transmitted in the first time unit is received by a second device, the second device can send feedback information. If the feedback information is used to indicate that the first data is received, the first device may receive the feedback information in the second time unit, as shown in FIG. 5A. Then, the first device stops transmitting the first data in the third time unit. In this case, M is 3. For the third time unit, if the first device has prepared other data before the third time unit, and the data is determined based on another redundancy version and to-be-transmitted system bits, for example, a plurality of data buffers being stored in the first device, the first device may transmit the other data in the third time unit. Alternatively, if the first device requires, after receiving the feedback information, a processing latency for preparing other data, the first device may transmit the other data from the fourth time unit, and does not transmit system bits in the third time unit, not excluding transmission of other system bits. After the first device stops transmitting the first data, a data transmission mode of the first device in the third time unit to the eighth time unit is not specifically limited. In addition, if a self-contained feedback system is considered, in FIG. 5A, the first device may receive, in the first time unit at the earliest, feedback information that is intended for the first data and that is sent by the second device. In this case, the second device may stop repeated transmission of the first data in the second time unit. In this case, M is 2.

Figure 5B:
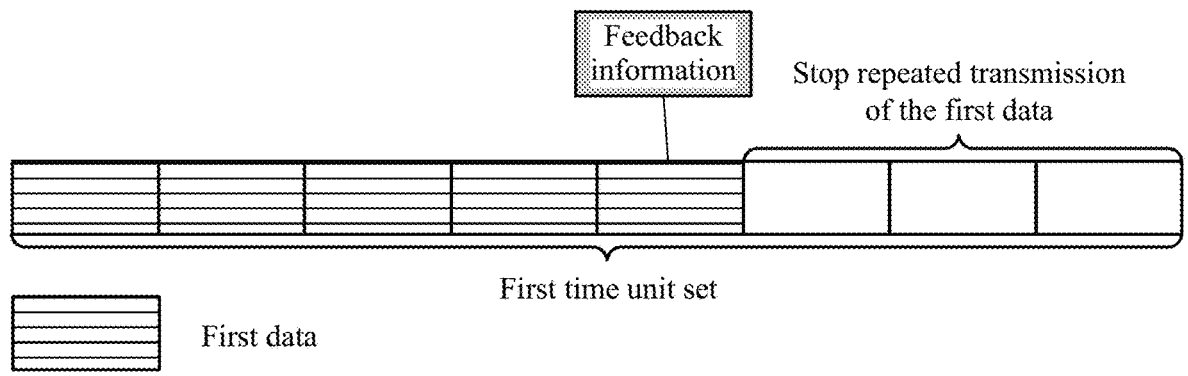
FIG. 5B is a schematic timing diagram of a second embodiment of repeatedly transmitting first data disclosed in an embodiment of this application.

FIG. 5B is a schematic timing diagram of a second embodiment of repeatedly transmitting first data disclosed in an embodiment of this application. As shown in FIG. 5B, an example in which a first time unit set includes consecutive time units is used. Herein, the first time unit set includes eight time units, that is, K is 8. The first device repeatedly transmits the first data from the first time unit. After the first data transmitted in the first time unit is received by a second device, the second device can send feedback information. In the embodiment shown in FIG. 5B, the feedback information is used to indicate that the first data is correctly received or incorrectly received. Because the second device needs to process the first data, when FIG. 5B is compared with FIG. 5A, a time unit in FIG. 5B in which the first device receives the feedback information is later than a time unit in FIG. 5A in which the first device receives the feedback information. As shown in FIG. 5B, the first device receives the feedback information in the fifth time unit. In this case, M is 6.

In FIG. 5B, if the feedback information is used to indicate that the first data is correctly received, the first device stops transmitting to-be-transmitted system bits in the sixth to the eighth time units. In other words, the first device does not transmit, in the sixth to the eighth time units any longer, data corresponding to the to-be-transmitted system bits. Optionally, the first device can transmit, in the sixth to the eighth time units, other to-be-transmitted system bits or data corresponding to the other to-be-transmitted system bits.

If the feedback information is used to indicate that the first data is incorrectly received, the first device may continue with, in the sixth to the eighth time units, repeated transmission of to-be-transmitted system bits corresponding to the first data. A data transmission mode of the first device in the sixth to the eighth time units is not specifically limited. Optionally, a redundancy version corresponding to the to-be-transmitted system bits transmitted by the first device in the sixth to the eighth time units is different from a first redundancy version, or a redundancy version corresponding to the to-be-transmitted system bits transmitted by the first device in the sixth to the eighth time units may be the same as a first redundancy version. In other words, the first device may still transmit the first data in at least one time unit within the sixth to the eighth time units. However, a method for determining a quantity of times of repeatedly transmitting the first data within this time range is different from a method for determining a quantity of times of repeatedly transmitting the first data by the first device in the first to the fifth time units. In this embodiment of the present invention, a quantity of times the first device repeatedly transmits the first data before receiving the feedback information is related to the feedback information. In other words, the first device may end repeated transmission of the first data at a time at which the first device receives the feedback information. After the first device receives the feedback information, whether the first device repeatedly transmits the first data or does not repeatedly transmit the first data in a remaining time unit within the first time unit set may be selected by the first device, or may be determined by the first device based on configuration information sent by the second device. The configuration information may be physical layer signaling, may be higher layer signaling, for example, RRC broadcast signaling or RRC dedicated signaling, or may be medium access control (Medium Access Control, MAC) signaling. This is not specifically limited herein.

It may be understood that if the first device has a capability of rapidly demodulating data, assuming that the first device receives, in the $(M-1)^{th}$ time unit, the feedback information sent by the second device, the first device may stop repeated transmission of the first data in a latter period of time included in the $(M-1)^{th}$ time unit at the earliest, and this is equivalent to that the first device transmits only a part of the first data in the $(M-1)^{th}$ time unit. For example, assuming that the $(M-1)^{th}$ time unit includes 14 orthogonal frequency division multiplexing (OFDM) symbols, and the feedback information sent by the second device is sent through a physical layer downlink control channel that occupies two OFDM symbols in time, the first device can receive the feedback information in the first two OFDM symbols in the $(M-1)^{th}$ time unit. Therefore, the first device may stop repeated transmission of the first data in the latter period of time of the $(M-1)^{th}$ time unit.

Figure 6:
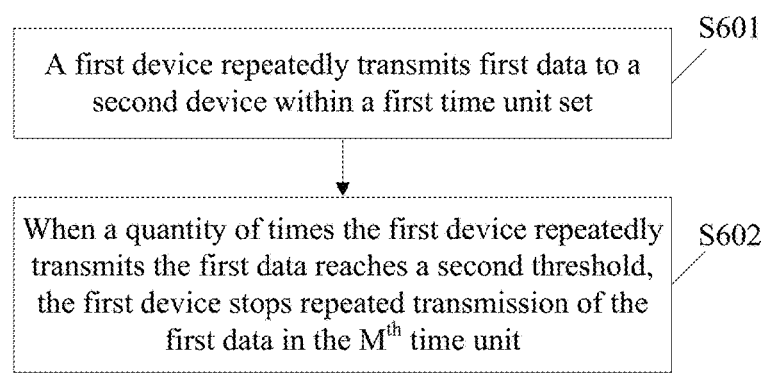
FIG. 6 is a schematic flowchart of another data transmission method disclosed in an embodiment of this application.

FIG. 6 is a schematic flowchart of still another data transmission according to an embodiment of this application. As shown in FIG. 6, the method includes the following steps.

Step S601: A first device repeatedly transmits first data to a second device within a first time unit set, where the first data is determined based on a first redundancy version and to-be-transmitted system bits, the first time unit set includes K time units, K≥3, and K is an integer.

Step S602: When a quantity of times the first device repeatedly transmits the first data reaches a second threshold, the first device stops repeated transmission of the first data in the $M^{th}$ time unit.

Herein, a value of M is 3≤M≤K. In other words, in this implementation, the first device repeatedly transmits the first data at least twice within the first time unit set.

In some possible implementations, the first device repeatedly transmits the first data to the second device within the first time unit set. If the first device does not receive, when the quantity of times the first device repeatedly transmits the first data reaches the second threshold, feedback information that is intended for the first data and that is sent by the second device, or when the quantity of times the first device repeatedly transmits the first data reaches the second threshold, the first device stops repeated transmission of the first data in the $M^{th}$ time unit. The second threshold may be pre-configured; and/or may be notified of by using dynamic signaling; or may be pre-defined; or may be selected by the first device. This is not specifically limited herein. For example, as previously described, an example in which the first device is user equipment is used. In an application scenario of uplink grant free transmission, while configuring an uplink grant free transmission resource for the user equipment, a base station may configure the quantity of times of repeatedly transmitting the first data, that is, configure M−1. For another example, the UE may alternatively determine, based on a historical uplink data transmission status, the quantity of times of repeatedly transmitting the first data. For example, the UE repeatedly transmits the first data within the first time unit set for M−1 times, and receives, in a first time window after repeated transmission of the first data is stopped, feedback information sent by the base station. The first time window includes at least one time unit. Further, optionally, the first time unit included in the first time window is the first time unit after the UE stops repeated transmission of the first data (for example, the sixth time unit included in a first time unit set in FIG. 7). In this case, the UE may reduce or increase, within a next first time unit set, the quantity of times of repeatedly transmitting the first data. For example, if the UE receives, in the first time window, acknowledgement information fed back by the base station, and the information is used to indicate that the base station correctly receives the to-be-transmitted system bits, the UE may reduce, within the next first time unit set, the quantity of times of repeatedly transmitting the first data; conversely, if the UE receives, in the first time window, negative acknowledgement information fed back by the base station, and the information is used to indicate that the base station does not correctly receive the to-be-transmitted system bits, the UE may increase, within the next first time unit set, the quantity of times of repeatedly transmitting the first data. For another example, the UE may alternatively determine, based on a transmission code rate used for transmitting the to-be-transmitted system bits, the quantity of times of repeatedly transmitting the first data. A description of the transmission code rate is the same as the foregoing description, and details are not described herein again. Alternatively, more generally, the UE may determine, based on a quantity of system bits included in each redundancy version, especially a redundancy version 0, a quantity of times, corresponding to the redundancy version 0 and the to-be-transmitted system bits, of repeatedly transmitting the first data.

In this embodiment of this application, the second threshold may be M−1. Assuming that a processing time is four time units, in one case, a first device receives the feedback information in the fifth time unit. In this case, the second threshold may be set to 5. Certainly, the second threshold may be alternatively 6, or the second threshold is a multiple of 5 or 6. For example, the second threshold is set to 10. In this case, the first device repeatedly transmits the first data for 10 times.

For a specific manner of repeatedly transmitting the first data by the first device, refer to a specific description of the method shown in FIG. 4. Details are not described herein again.

Figure 7:
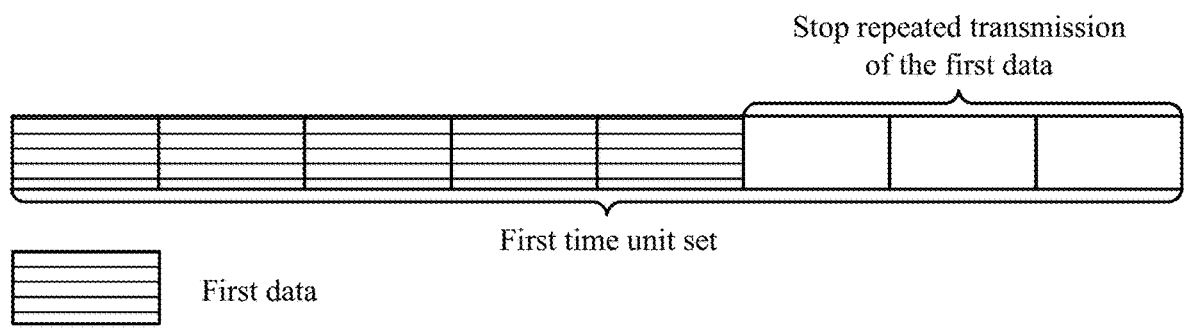
FIG. 7 is a schematic timing diagram of a third embodiment of repeatedly transmitting first data disclosed in an embodiment of this application.

FIG. 7 is a schematic timing diagram of a third embodiment of repeatedly transmitting first data disclosed in an embodiment of this application. As shown in FIG. 7, a first device repeatedly transmits the first data from the first time unit. It may be understood that if a second device needs to perform processing on the received first data, the processing herein spans from receiving the first data to restoring to-be-transmitted system bits corresponding to the first data. It should be noted that restoring the to-be-transmitted system bits corresponding to the first data includes correct restoration and incorrect restoration. A first time unit set in FIG. 7 includes eight time units, that is, K is 8. Repeated transmission of the first data is stopped in the fifth time unit. In this case, M is 5. A data transmission mode of the first device in the sixth time unit to the eighth time unit is not specifically limited herein.

Based on the method shown in FIG. 4 or FIG. 6, after the first device stops repeated transmission of the first data in the $M^{th}$ time unit in the first time unit set, the first device may repeatedly transmit the to-be-transmitted system bits within a second time unit set. The second time unit set includes the $M^{th}$ time unit to the $K^{th}$ time unit. It may be understood that if M=K, the second time unit set includes only one time unit. In other words, the first time unit set includes the $K^{th}$ time unit. In one case, the second time unit set starts from the $M^{th}$ time unit and ends at the $K^{th}$ time unit.

In this embodiment of the present invention, the first device repeatedly transmits the to-be-transmitted system bits within the second time unit set until the first device receives second feedback information sent by the second device. The second feedback information is feedback information that is intended for the system bits and that is sent by the second device, and is used to indicate a status of receiving the system bits by the second device. The reception status herein includes: The second device correctly receives the system bits, or the second device does not correctly receive the system bits.

In another implementation, the first device repeatedly transmits the to-be-transmitted system bits within the second time unit set until a quantity of times the first device repeatedly transmits the system bits to the second device reaches a third threshold.

Further, optionally, the quantity of times the first device repeatedly transmits the system bits to the second device includes a quantity of times of repeatedly transmitting the first data and a quantity of times the first device repeatedly transmits the to-be-transmitted system bits within the second time unit set. For example, the third threshold may be equal to K (that is, equal to a quantity of time units included in the first time unit set). In other words, after the first device repeatedly transmits the to-be-transmitted system bits within the first time unit set for K times, the first device may stop repeated transmission of the to-be-transmitted system bits. Alternatively, assuming that the first device stops repeated transmission of the first data in the $M^{th}$ time unit (it may be understood that the quantity of times of repeatedly transmitting the first data is M−1), and then repeatedly transmits the system bits within the second time unit set for K−M+1 times, the first device may stop repeated transmission of the to-be-transmitted system bits.

Alternatively, optionally, the quantity of times the first device repeatedly transmits the system bits to the second device includes only a quantity of times the first device repeatedly transmits the to-be-transmitted system bits within the second time unit set. For example, assuming that the first device repeatedly transmits the first data within the first time unit set for M−1 times, the third threshold may be equal to K−M+1. In other words, when the first device repeatedly transmits the to-be-transmitted system bits within the second time unit set for K−M+1 times, the first device may stop repeated transmission of the to-be-transmitted system bits.

With reference to an accompanying drawing, the following specifically describes an implementation of repeatedly transmitting the to-be-transmitted system bits by the first device within the second time unit set.

Figure 8:
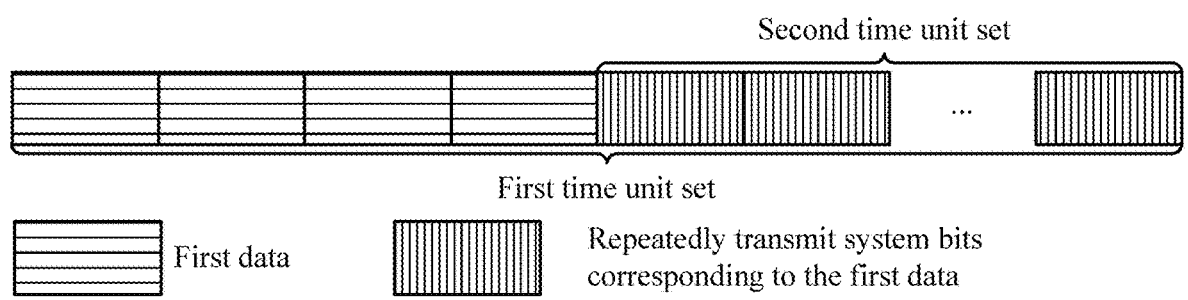
FIG. 8, FIG. 9, FIG. 10A to FIG. 10C, FIG. 11A, and FIG. 11B are schematic timing diagrams of some embodiments of repeatedly transmitting system bits by a first device within a second time unit set disclosed in an embodiment of this application.

FIG. 8 is a schematic timing diagram of a first embodiment of repeatedly transmitting system bits by a first device within a second time unit set disclosed in an embodiment of this application. As shown in FIG. 8, the first device repeatedly transmits first data from the first time unit, and stops repeated transmission of the first data in the $M^{th}$ time unit. A condition of that the first device stops repeated transmission of the first data in the $M^{th}$ time unit is that the first device receives feedback information that is intended for the first data and that is sent by the second device, or that a quantity of times the first device repeatedly transmits the first data reaches a second threshold. The first device repeatedly transmits, within the second time unit set, system bits corresponding to the first data. In FIG. 8, the second time unit set includes the $M^{th}$ time unit to the $K^{th}$ time unit. The first device may repeatedly transmit, within the second time unit set, the to-be-transmitted system bits by using other data. The other data is data transmitted by the first device in any time unit in the second time unit set. The other data and the first data are corresponding to same to-be-transmitted system bits, and may be corresponding to a same redundancy version or different redundancy versions.

Figure 10A:
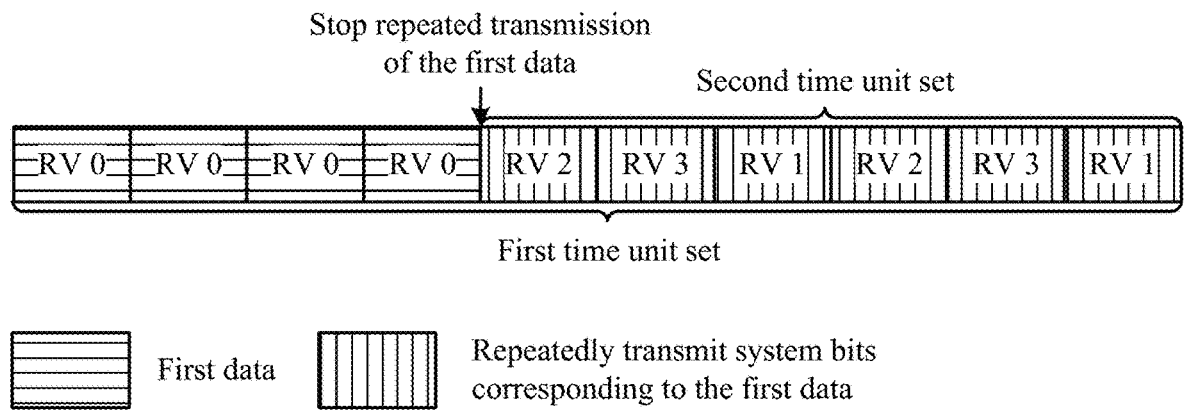
Figure 10B:
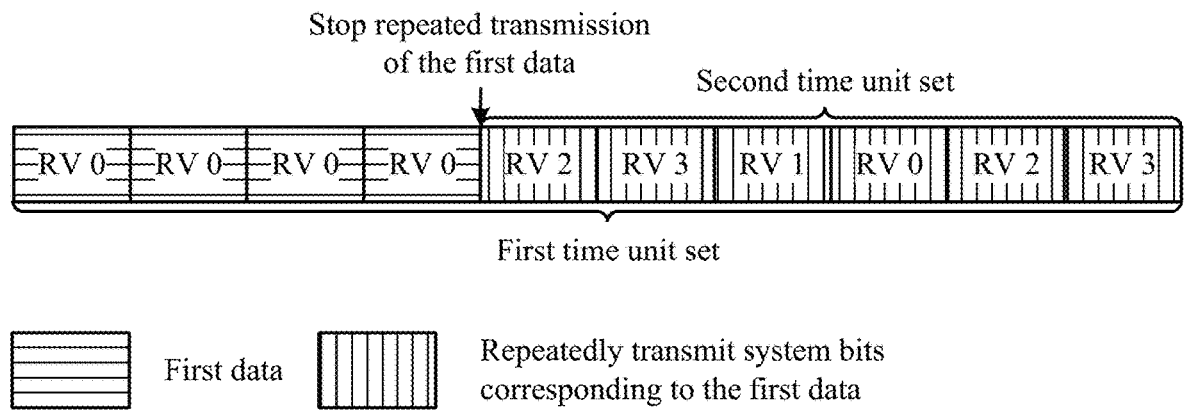
Figure 10C:
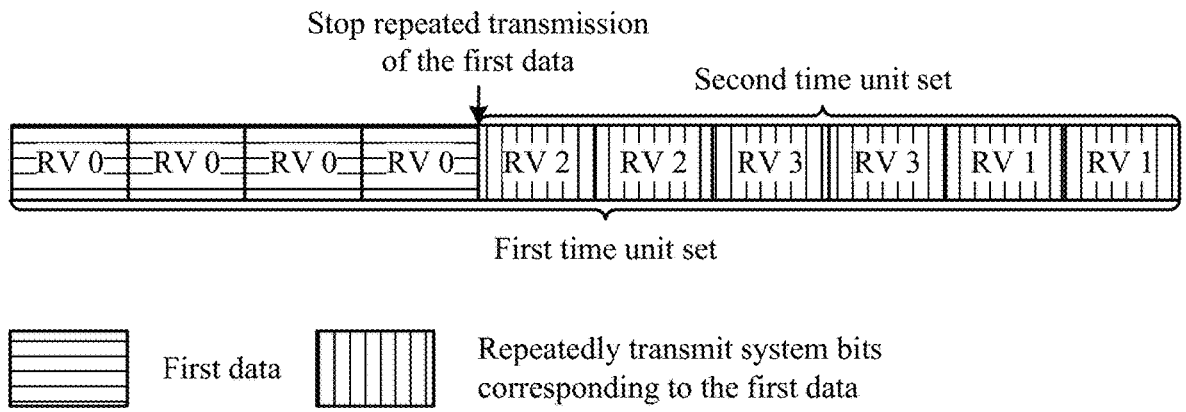

The following describes a data transmission form of a first device in a second time unit set with reference to FIG. 10A to FIG. 10C. A redundancy version corresponding to data transmitted by the first device in each time unit based on a timing relationship (a chronological order in time) within the second time unit set may be pre-configured, and/or may be notified of by using dynamic signaling, or may be pre-defined, or may be selected by the first device from a preset sample library, or may be obtained in another manner. This is not specifically limited herein. For example, redundancy versions corresponding to data transmitted in time units may be in a cycle of an order of an RV 2, an RV 3, and an RV 1, as shown in FIG. 10A; or redundancy versions corresponding to data transmitted in time units may be in a cycle of an order of an RV 2, an RV 3, an RV 1, and an RV 0, as shown in FIG. 10B; or redundancy versions corresponding to data transmitted in time units may be in a cycle of an order of an RV 0, an RV 2, an RV 3, and an RV 1; or redundancy versions corresponding to data transmitted in time units may be in a cycle of an order of an RV 2 and an RV 0. In the foregoing implementation, the first device may further repeatedly transmit, within the second time unit set, data corresponding to a redundancy version. As shown in FIG. 10C, redundancy versions corresponding to data transmitted in time units are the RV 2, the RV 3, and the RV 1 sequentially. Data corresponding to each redundancy version is repeatedly transmitted twice. Optionally, a quantity of times of repeatedly transmitting data corresponding to the RV 2/RV 3/RV 1 may be different. Optionally, only second data may be repeatedly transmitted within the second time unit set. Assuming that a redundancy version corresponding to the second data is the RV 2, the first device may repeatedly transmit the second data within the second time unit set. It should be noted that optionally, if the first device repeatedly transmits, within the second time unit set, data corresponding to to-be-transmitted system bits, a quantity of times of repeated transmission is different from a quantity of times of repeatedly transmitting first data. In the foregoing process, a redundancy version corresponding to the to-be-transmitted system bits transmitted by the first device within the second time unit set, and/or a quantity of times of repeatedly transmitting data corresponding to the redundancy version may be pre-configured, and/or may be notified of by using dynamic signaling, or may be pre-defined, or may be selected by the first device. This is not specifically limited herein. The RV 0, the RV 1, the RV 2, and the RV 3 described in this embodiment of this application are version numbers of redundancy versions. The RV 0, the RV 1, the RV 2, and the RV 3 are a version number 0, a version number 1, a version number 2, and a version number 3, respectively.

Figure 9:
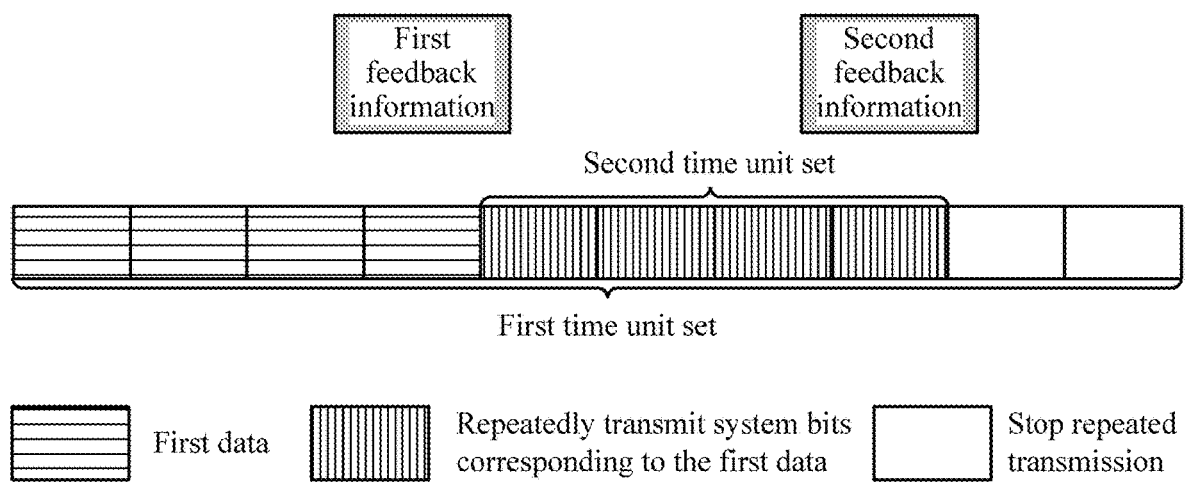

In some possible implementations, the first device may further receive feedback information from the second device in a time unit in the second time unit set. For distinguishing the feedback information from feedback information received by the first device during repeated transmission of the first data, the feedback information received by the first device during repeated transmission of the first data is defined as first feedback information, and the feedback information from the second device received in a time unit in the second time unit set is defined as second feedback information. FIG. 9 is used as an example to describe receiving the feedback information from the second device by the first device. FIG. 9 is a schematic timing diagram of a second embodiment of repeatedly transmitting system bits by a first device within a second time unit set disclosed in an embodiment of this application.

In FIG. 9, it is assumed that a first time unit set includes 10 time units, and the first device repeatedly transmits first data from the first time unit included in the first time unit set. If the first device receives first feedback information in the fourth time unit included in the first time unit set, and the first feedback information indicates that the first data is incorrectly received or indicates that the first data is received, the first device may stop repeated transmission of the first data from the fifth time unit included in the first time unit set, and repeatedly transmits, from the fifth time unit, system bits corresponding to the first data. Assuming that the first device receives second feedback information in the eighth time unit included in the first time unit set, and the second feedback information indicates that the information bits corresponding to the first data are incorrectly received or are correctly received, the first device may stop repeated transmission of the system bits in the ninth time unit and the tenth time unit that are included in the first time unit set. Optionally, the first device may still transmit the system bits in the ninth time unit and the tenth time unit that are included in the first time unit set. For example, the first device may determine, based on scheduling information from the second device, whether the information bits need to be transmitted in the ninth time unit and the tenth time unit. For example, when the second feedback information indicates that the system bits are incorrectly received (NACK), the second device may further send scheduling information. The scheduling information is used to instruct the first device to transmit the information bits in the ninth time unit and/or the tenth time unit. Optionally, the scheduling information may alternatively instruct the first device to transmit the information bits in another time unit that is not in the first time unit set. In this embodiment of the present invention, the scheduling information may be sent by using physical layer signaling. Assuming that the second device is a base station, the second device may send the scheduling information by using UL grant control information.

In some possible implementations, similar to the first feedback information, the second feedback information may be transmitted through a PHICH, a PDCCH, an EPDCCH, or another downlink channel, and the second feedback information may be sent through a UE specific downlink control channel (for example, a UE specific (E)PDCCH), a UE group specific downlink control channel (for example, a UE group specific (E)PDCCH), or a cell common downlink control channel. This is not specifically limited herein. A specific form of the second feedback information is similar to a specific form of the first feedback information, or the second feedback information may be in another form. This is not specifically limited herein.

It should be noted that repeatedly transmitting the to-be-transmitted system bits or repeatedly transmitting the system bits described in the foregoing embodiment may also be understood as repeatedly transmitting a TB or a CB.

Figure 11A:
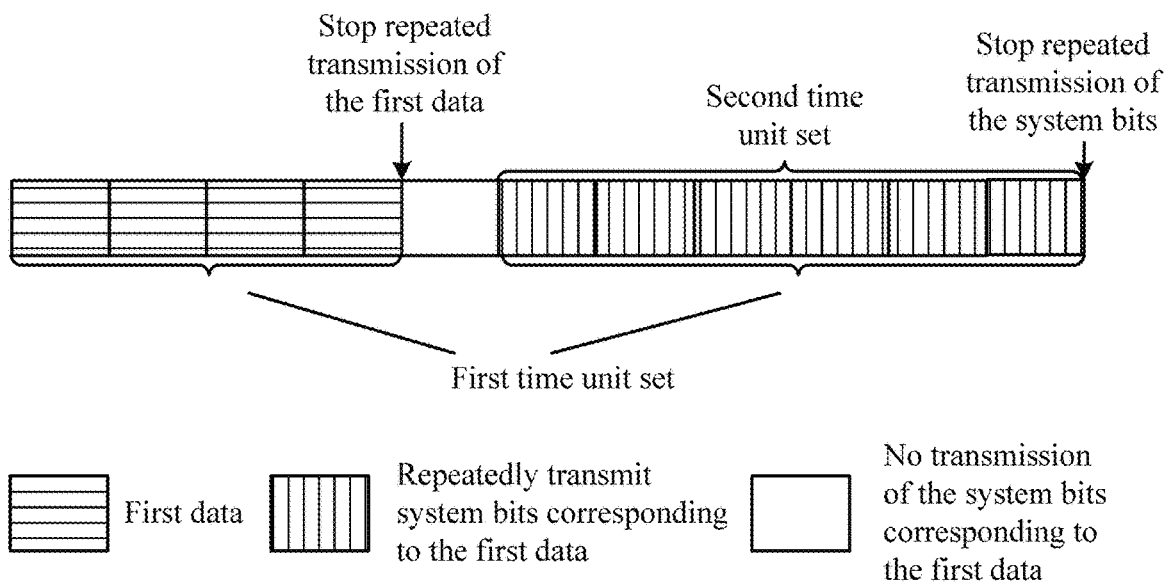
Figure 11B:
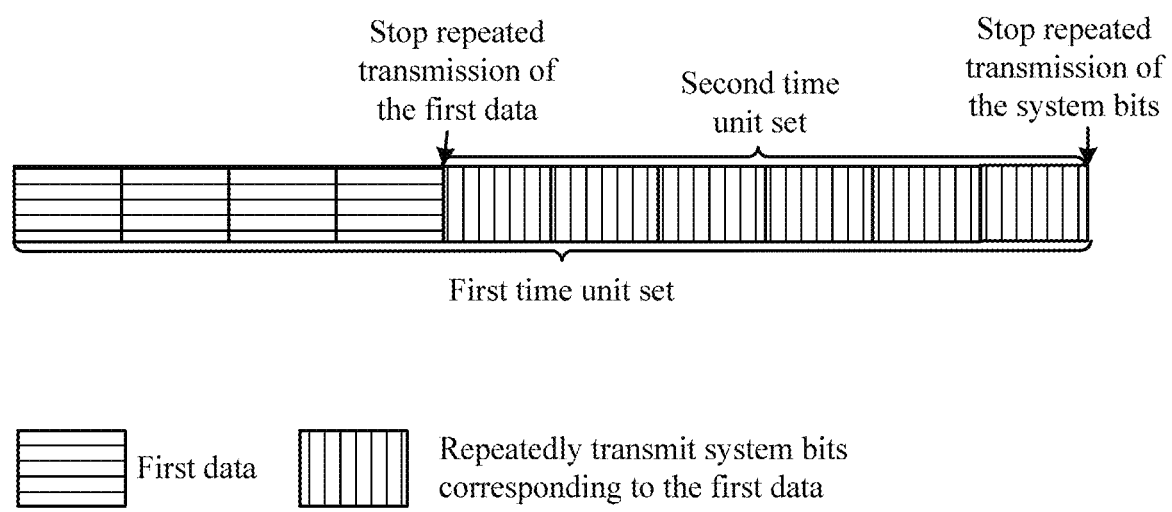

It should be noted that in the embodiments of the present invention, the K time units included in the first time unit set are time units in which the to-be-transmitted system bits can be transmitted, and may not include a time unit in which the to-be-transmitted system bits cannot be transmitted due to a processing latency. It is assumed that the first condition is that the first device receives the first feedback information that is intended for the first data and that is sent by the second device. In other words, after receiving the first feedback information, the first device stops repeated transmission of the to-be-transmitted system bits, and the first device repeatedly transmits the system bits within the second time unit set until a quantity of times of repeatedly transmitting the system bits reaches K. FIG. 11A shows a manner. Assuming that a first time unit set includes 10 time units, the first device repeatedly transmits first data from the first time unit, and the first device receives first feedback information in the fourth time unit, the first device may stop repeated transmission of the first data in the fifth time unit. Considering a processing latency, assuming that the first device can transmit second data from the sixth time unit at the earliest (herein, the second data includes data that is determined based on a second redundancy version and to-be-transmitted system bits; the second redundancy version may be the same as or different from a first redundancy version; and in this example, preferably, the second redundancy version may be different from the first redundancy version), it may be understood that the first device does not transmit the to-be-transmitted system bits in the fifth time unit, and the fifth time unit may not be included in the first time unit set. The 10 time units included in the first time unit set may be corresponding to the first time unit to the fourth time unit and the sixth time unit to the eleventh time unit in FIG. 1A. FIG. 11B shows another manner. Assuming that after receiving first feedback information, the first device is capable of starting to transmit second data in a time unit that is closest to a time at which the first feedback information is received, 10 time units included in a first time unit set are corresponding to the first time unit to the tenth time unit in FIG. 11B.

It should be noted that in this application, the to-be-transmitted system bits may include a parity check bit, or may not include a parity check bit.

Figure 12:
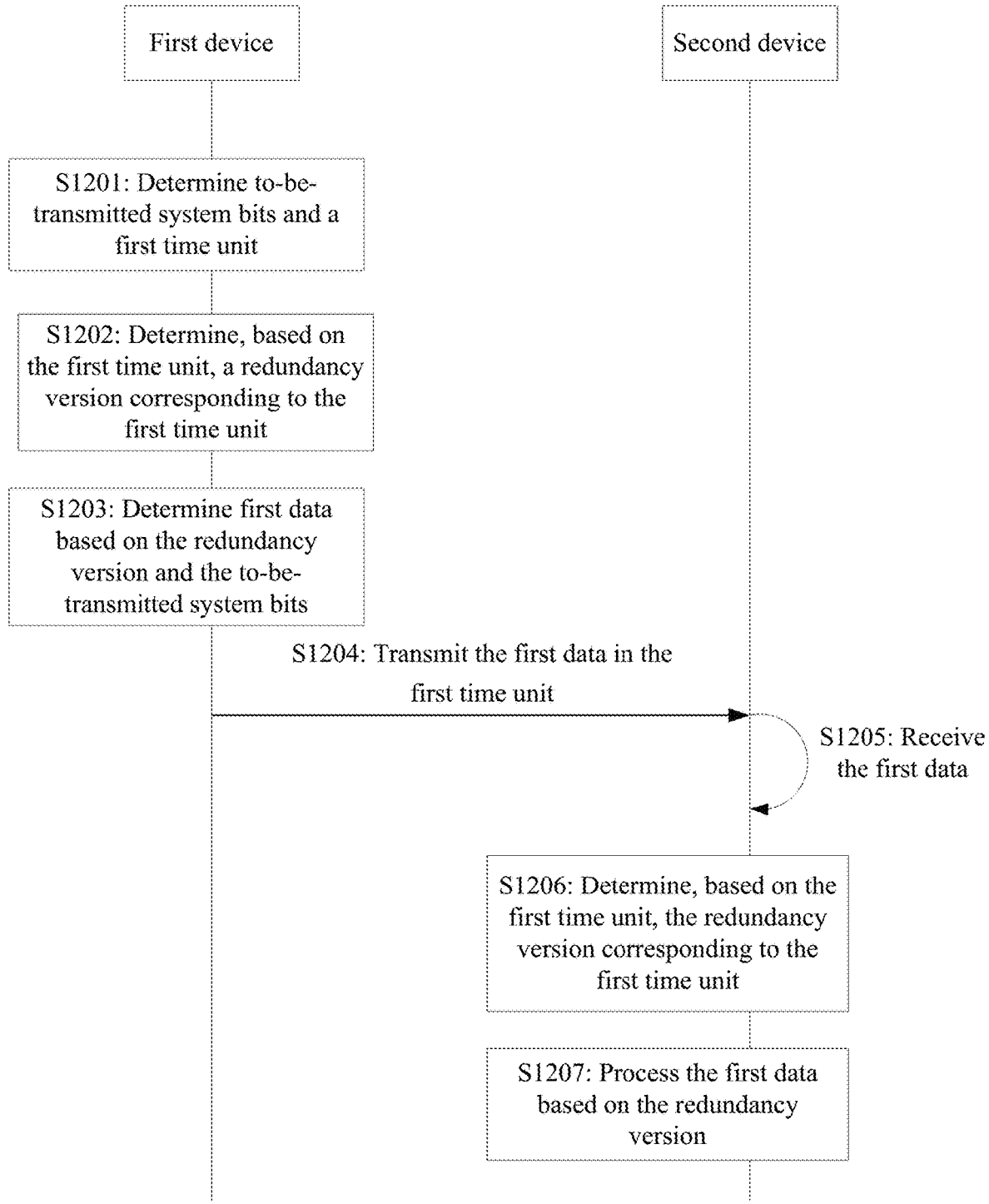
FIG. 12 is a schematic flowchart of still another data transmission method disclosed in an embodiment of this application.

The following describes another data transmission mode with reference to FIG. 12.

FIG. 12 is a schematic flowchart of still another data transmission according to an embodiment of this application. As shown in FIG. 12, the method includes the following steps.

Step S1201: A first device determines to-be-transmitted system bits and a first time unit, where the first time unit is used for transmitting the system bits.

Step S1202: The first device determines, based on the first time unit, a redundancy version corresponding to the first time unit.

Step S1203: The first device determines first data based on the redundancy version and the to-be-transmitted system bits.

Step S1204: The first device transmits the first data to a second device in the first time unit.

Step S1205: The second device receives, in the first time unit, the first data transmitted by the first device.

Step S1206: The second device determines, based on the first time unit, the redundancy version corresponding to the first time unit.

Step S1207: The second device processes the first data based on the redundancy version.

That the second device processes the first data based on the redundancy version includes that the second device determines, based on the redundancy version and the first data, system bit information corresponding to the first data. The second device can determine, based on the redundancy version and the first data, channel coded data corresponding to the first data. A description of the channel coded data is the same as a description of the channel coded data in FIG. 2. Then, the second device restores corresponding system bit information based on the channel coded data. In a possible implementation, the second device may process the channel coded data through channel decoding. Preferably, this implementation is applicable to the following scenario: The channel coded data corresponding to the first data includes all to-be-transmitted system bit information. A decoding result may be that the system bit information corresponding to the channel coded data is correctly restored (that is, decoding succeeds), or may be that the system bit information corresponding to the channel coded data is incorrectly restored (that is, decoding fails). In another possible implementation, the second device may process the channel coded data through combined detection and/or channel decoding. For example, the second device receives a plurality of pieces of data corresponding to same to-be-transmitted system bits, and then after processing these data to obtain channel coded data, the second device may combine, according to a rule, for example, chase combining (CC) or incremental redundancy (IR) combining, the channel coded data corresponding to these data, and then perform channel decoding.

More generally, in this embodiment of this application, processing the first data by the second device may be an inverse operation of a process of processing the to-be-transmitted system bits to obtain transmission data. The process of processing the to-be-transmitted system bits to obtain transmission data is described above, and details are not described herein again.

In a possible implementation, the first device and the second device may determine, based on an index number of the first time unit, the redundancy version corresponding to the first time unit.

In a possible implementation, a specific implementation of determining a correspondence between a time unit and a redundancy version by the first device and the second device may include at least the following methods.

(1) A version number of a redundancy version (RV index) may be determined based on the following formula: RV Index=(CURRENT_TTI+Offset) mod numberOfConfRV-Num.

CURRENT_TTI is an index number of a time unit corresponding to the RV version number. Assuming that a time unit is a subframe, an index number of the subframe may be represented by an index of a subframe in a radio frame. Assuming that one radio frame includes N subframes, and subframe index numbers corresponding to the N subframes are a subframe 0, a subframe 1, . . . , and a subframe N−1, a value of CURRENT_TTI is any value from 0 to N−1. Alternatively, a subframe index number may be expressed by an absolute value in a system. Assuming that in a system, one radio superframe includes M radio frames, and each radio frame includes N subframes, a value of CURRENT_TTI may be expressed in (SFN*N)+i, where SFN represents a system frame number, SFN is an integer greater than or equal to 0 but less than or equal to M−1, M is a largest system frame number, that is, different SFNs are corresponding to different radio frames, and i is an integer greater than or equal to 0 but less than or equal to N−1. Alternatively, the subframe index number may be represented by a slot number. Assuming that one subframe includes two slots, the subframe index number may be expressed in floor(Ns/2), where floor(X) indicates an operation of rounding down X, and Ns/2 represents dividing Ns by 2.

It may be understood that CURRENT_TTI may be alternatively expressed in another form. For example, in a 5G communications system, CURRENT_TTI may be alternatively expressed in another form. This is not specifically limited.

In the foregoing formula, "X mod Y" represents an REM operation, and numberOfConfRV-Num represents a quantity of different RVs that can be used during transmission or repeated transmission of the to-be-transmitted system bits. This parameter may be pre-configured, and/or may be indicated by using dynamic signaling. Alternatively, this parameter is selected by the first device. This is not specifically limited herein. Similarly, a parameter configuration mode of Offset is the same as a parameter configuration mode of numberOfConfRV-Num, or Offset may be 0. In other words, the RV index may be determined directly by "CURRENT_TTI mod numberOfConfRV-Num".

In a possible implementation, a result of "CURRENT_TTI mod numberOfConfRV-Num" is directly used as a version number of an RV. For example, assuming that numberOfConfRV-Num=4, the result of "CURRENT_TTI mod numberOfConfRV-Num" is 0, 1, 2, or 3, and a version number of a corresponding RV may also directly be 0, 1, 2, or 3. In another possible implementation, there may be fixed correspondences between results of "CURRENT_TTI mod numberOfConfRV-Num" and version numbers of different RVs. For example, when a result of "CURRENT_TTI mod numberOfConfRV-Num" is 0, 1, 2, or 3, a corresponding RV version number may be 0, 2, 3, or 1. The correspondences may be alternatively in another representation form. Details are not described herein. The correspondences may be pre-configured, and/or may be notified of by using dynamic signaling, or may be pre-defined. This is not specifically limited.

(2) Different start offsets, periods, and quantities of repetitions may be configured for different RVs. For example, for the RV 0, on the second device (a base station is used as an example), a start offset in which data corresponding to the RV 0 is transmitted is configured to be the $j^{th}$ time unit, and a period is configured to be S time units. From a perspective of time, the UE transmits the data corresponding to the RV 0 in the $(j+(i-1)*S)^{th}$ time unit, where i is an integer not less than 0. Further, optionally, a quantity of times of repeated transmission corresponding to the RV 0, for example, L, may be configured on the base station, where L is an integer not less than 2 but less than M. In this case, the UE transmits the data corresponding to the RV 0 in the $(j+(i-1)*S+q)^{th}$ time unit, where q is an integer not less than 0 but less than L. For another redundancy version, a similar configuration also exists, and details are not described herein. In addition, an example in which the RV 0 uses the foregoing configurations is used. If repeated transmission is not used, between the $(+(i-1)*S)^{th}$ time unit and the $(j+i*S)^{th}$ time unit, data corresponding to another redundancy version, for example, the RV 1/RV 2/RV 3, may be transmitted based on a preconfigured pattern. If the data corresponding to the RV 0 is repeatedly transmitted, between the $(j+(i-1)*S+(L-1))^{th}$ time unit and the $(j+i*S)^{th}$ time unit, data corresponding to another redundancy version, for example, the RV 1/RV 2/RV 3, may also be transmitted based on a preconfigured pattern.

In a possible implementation, for a particular RV, a period and a start offset that are of the RV may be configured. For example, for the RV 0, a period of the RV 0 may be configured to be RV0-Period, and an offset of the RV 0 may be configured to be RV0-Offset, where a value of RV0-Offset is an integer greater than or equal to 0 but less than or equal to RV0-Period-1. An index number of a time unit corresponding to the RV 0 meets the following relationship: (10*nf−RV0-Offset+floor(Ns/2)) mod RV0-Period=0, where the index number of the time unit is 10*nf+floor(Ns/2), nf represents a radio frame number, 10 represents a quantity of subframes included in each radio frame, Ns represents a slot number, and a meaning of floor(X) is the same as that previously described. It may be understood that when RV0-Period and RV0-Offset are configured, the index number of the time unit corresponding to the RV 0 may be alternatively in another representation form. This is not specifically limited. Further, optionally, for the particular RV (for example, the RV 0 in the above example), a quantity of times of repeated transmission may be further configured. In this case, it may be understood that a time unit determined based on the foregoing formula is the first time unit corresponding to the RV 0. Optionally, when a period, a start offset, and a quantity of repetition times are configured for a particular RV, for another redundancy version, a possible implementation is that separate configuration may be performed in a manner similar to a manner of performing configuration for the RV 0, and another possible implementation is that there is a particular association relationship with configurations of the RV 0. For example, in a time unit not corresponding to the RV 0, other RVs are corresponding to different time units based on a fixed pattern (pattern). In addition, the foregoing two possible implementations may be combined for use. For example, some parameters are separately configured, and some parameters have a particular association relationship with the configurations of the RV 0.

In a possible implementation, the second device performs processing such as channel decoding on the first data based on the determined redundancy version.

It may be learned that the first device determines the redundancy version corresponding to the first time unit, so that accuracy of determining, by the second device, a redundancy version corresponding to data transmitted in the first time unit can be ensured, and further the second device can perform accurate HARQ combining, thereby reducing a data transmission latency.

With reference to the foregoing system and method embodiments, the following describes apparatus embodiments of the embodiments of this application.

Figure 13:
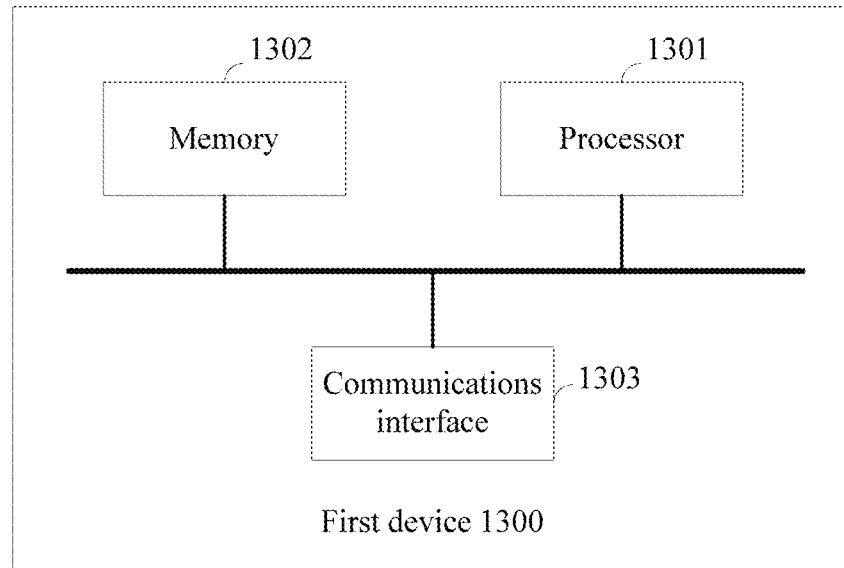
FIG. 13 is a schematic structural diagram of a first device disclosed in an embodiment of this application.

FIG. 13 is a schematic structural diagram of a first device disclosed in an embodiment of this application. The first device 1300 includes a processor 1301, a memory 1302, and a communications interface 1303. The processor 1301 controls wireless communication with an external network through the communications interface 1303. The communications interface 1303 includes but is not limited to: an antenna, an amplifier, a transceiver, a coupler, an LNA (Low Noise Amplifier), and a duplexer. The memory 1302 includes at least one of the following: a random access memory, a nonvolatile memory, and an external memory. Executable program code is stored in the memory 1302. The executable program code can direct the processor 1301 to perform the method specifically disclosed in the method embodiments of the present invention. The method includes the following steps: repeatedly transmitting first data to a second device within a first time unit set, where the first data is determined based on a first redundancy version and to-be-transmitted system bits, the first time unit set includes K time units, K≥3, and K is an integer; and when a first condition is met, stopping transmitting the first data in the $M^{th}$ time unit, where 2≤M≤K, and M is an integer.

It should be understood that the executable program code can direct the processor 1301 to perform the method that is performed by the first device and that is described in the foregoing method embodiments, for example, the method shown in FIG. 6. Details are not described herein again.

Figure 14:
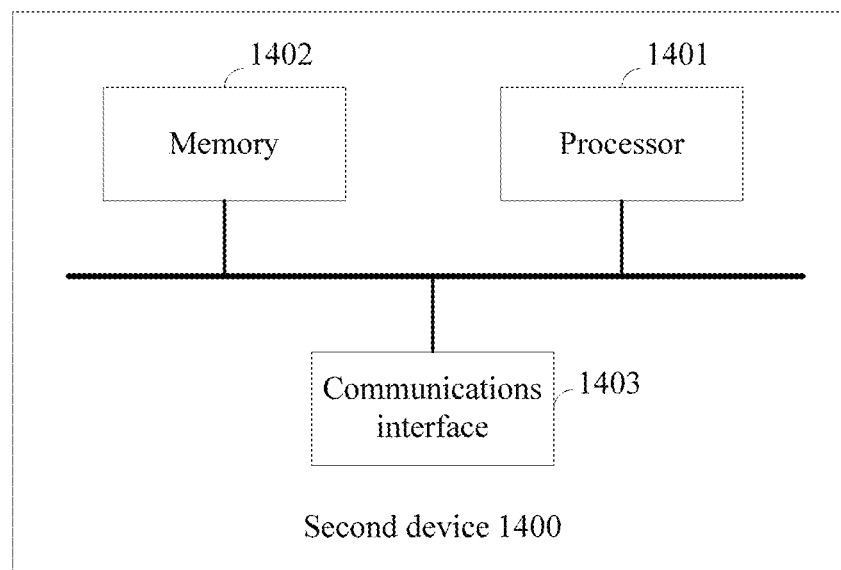
FIG. 14 is a schematic structural diagram of a second device disclosed in an embodiment of this application.

FIG. 14 is a schematic structural diagram of a second device disclosed in an embodiment of this application. The second device 1400 includes a processor 1401, a memory 1402, and a communications interface 1403. The processor 1401 controls wireless communication with an external network through the communications interface 1403. The communications interface 1403 includes but is not limited to: an antenna, an amplifier, a transceiver, a coupler, an LNA (Low Noise Amplifier), and a duplexer. The memory 1402 includes at least one of the following: a random access memory, a nonvolatile memory, and an external memory. Executable program code is stored in the memory 1402. The executable program code can direct the processor 1401 to perform the method specifically disclosed in the method embodiments of the present invention. The method includes the following steps: receiving, by a second device within a first time unit set, first data repeatedly transmitted by a first device, where the first data is determined based on a first redundancy version and to-be-transmitted system bits, the first time unit set includes K time units, K≥3, and K is an integer; and when a first condition is met, stopping, by the second device, receiving the first data in the $M^{th}$ time unit, where 2≤M≤K, and M is an integer.

It should be understood that the executable program code can direct the processor 1401 to perform the method that is performed by the second device and that is described in the foregoing method embodiments, for example, the method shown in FIG. 4. Details are not described herein again.

Figure 15:
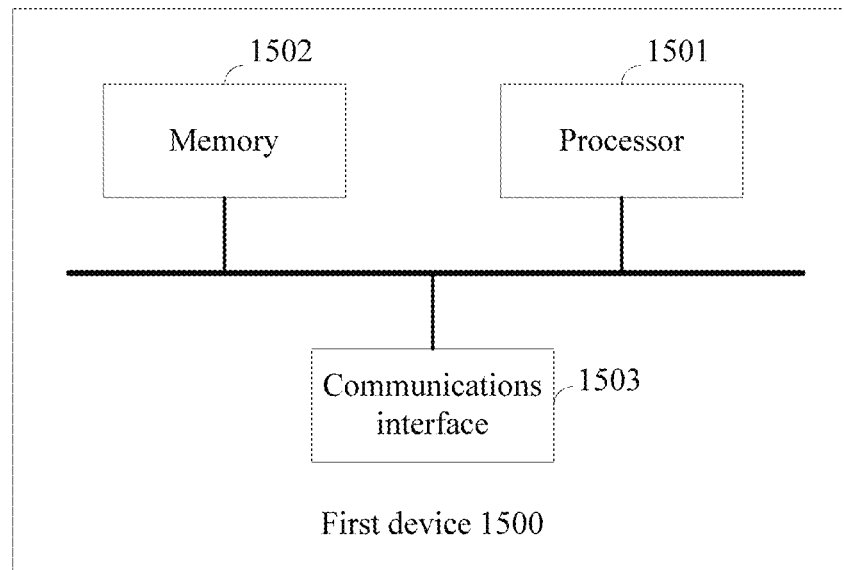
FIG. 15 is a schematic structural diagram of another first device disclosed in an embodiment of this application.

FIG. 15 is a schematic structural diagram of a first device disclosed in an embodiment of this application. The first device 1500 includes a processor 1501, a memory 1502, and a communications interface 1503. The processor 1501 controls wireless communication with an external network through the communications interface 1503. The communications interface 1503 includes but is not limited to: an antenna, an amplifier, a transceiver, a coupler, an LNA (Low Noise Amplifier), and a duplexer. The memory 1502 includes at least one of the following: a random access memory, a nonvolatile memory, and an external memory. Executable program code is stored in the memory 1502. The executable program code can direct the processor 1501 to perform the method specifically disclosed in the method embodiments of the present invention. The method includes the following steps: determining to-be-transmitted system bits and a first time unit; determining, based on the first time unit, a redundancy version corresponding to the first time unit; determining first data based on the redundancy version and the to-be-transmitted system bits; and transmitting the first data to the second device in the first time unit.

Figure 16:
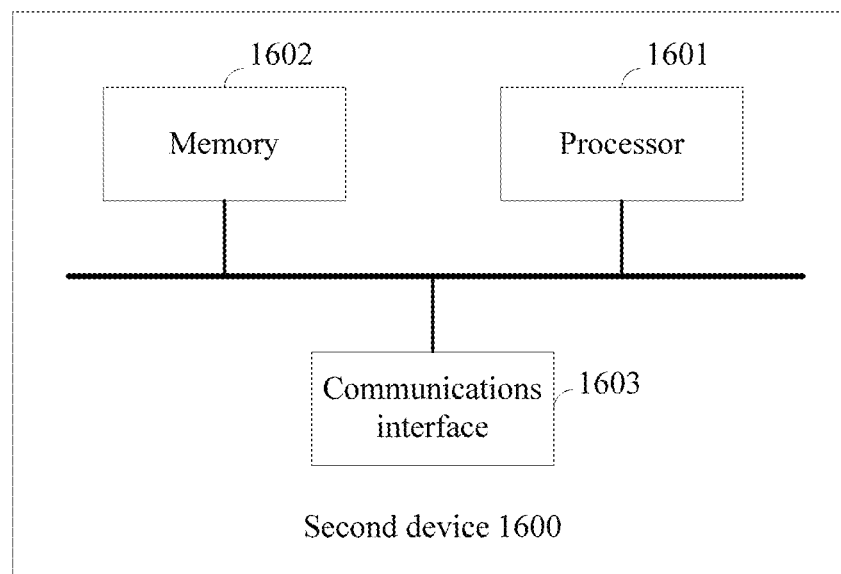
FIG. 16 is a schematic structural diagram of another second device disclosed in an embodiment of this application.

FIG. 16 is a schematic structural diagram of a second device disclosed in an embodiment of this application. The second device 1600 includes a processor 1601, a memory 1602, and a communications interface 1603. The processor 1601 controls wireless communication with an external network through the communications interface 1603. The communications interface 1603 includes but is not limited to: an antenna, an amplifier, a transceiver, a coupler, an LNA (Low Noise Amplifier), and a duplexer. The memory 1602 includes at least one of the following: a random access memory, a nonvolatile memory, and an external memory. Executable program code is stored in the memory 1602. The executable program code can direct the processor 1601 to perform the method specifically disclosed in the method embodiments of the present invention. The method includes the following steps: receiving, in a first time unit, first data transmitted by a first device; determining, based on the first time unit, a redundancy version corresponding to the first time unit; and processing the first data based on the redundancy version.

Based on the hardware structures described in the foregoing embodiments and based on the foregoing method embodiments, the following describes a functional block diagram of a device provided in the embodiments of this application. Functional blocks of the first device may be implemented by hardware, software, or a combination of the hardware and the software, to implement solutions of the present invention. A person skilled in the art should understand that, the functional blocks described in this application may be combined or separated into several sub-blocks, to implement the solutions of the embodiments of the present invention. Therefore, content described above in this application can support any possible combination or separation or further definition of the following function modules.

Figure 17:
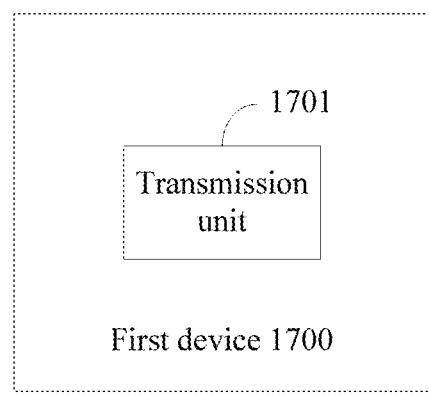
FIG. 17 is a functional block diagram of a first device disclosed in an embodiment of this application.

FIG. 17 is a functional block diagram of a first device. The first device 1700 includes a transmission unit 1701.

The transmission unit 1701 is configured to repeatedly transmit first data to a second device within a first time unit set, where the first data is determined based on a first redundancy version and to-be-transmitted system bits, the first time unit set includes K time units, K≥3, and K is an integer.

The transmission unit 1701 is further configured to: when a first condition is met, stop transmitting the first data in the $M^{th}$ time unit, where 2≤M≤K, and M is an integer.

It should be noted that the foregoing functional unit is further capable of performing some or all of the corresponding methods described in the foregoing method embodiments. For a hardware structure on which the foregoing functional unit is based, refer to the embodiment shown in FIG. 13. Details are not described herein again.

Figure 18:
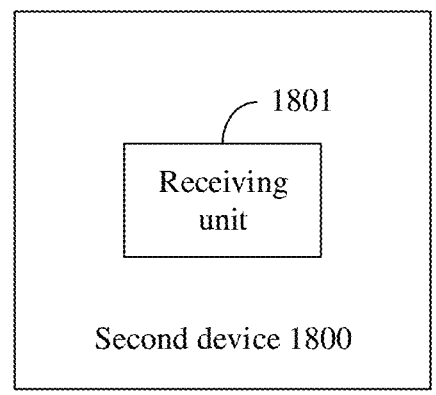
FIG. 18 is a functional block diagram of a second device disclosed in an embodiment of this application.

FIG. 18 is a functional block diagram of a second device. The second device 1800 includes a receiving unit 1801.

The receiving unit 1801 is configured to receive, within a first time unit set, first data repeatedly transmitted by a first device, where the first data is determined based on a first redundancy version and to-be-transmitted system bits, the first time unit set includes K time units, K≥3, and K is an integer.

The receiving unit 1801 is further configured to: when a first condition is met, stop receiving the first data in the $M^{th}$ time unit, where 2≤M≤K, and M is an integer.

It should be noted that the foregoing functional unit is further capable of performing some or all of the corresponding methods described in the foregoing method embodiments. For a hardware structure on which the foregoing functional unit is based, refer to the embodiment shown in FIG. 14. Details are not described herein again.

Figure 19:
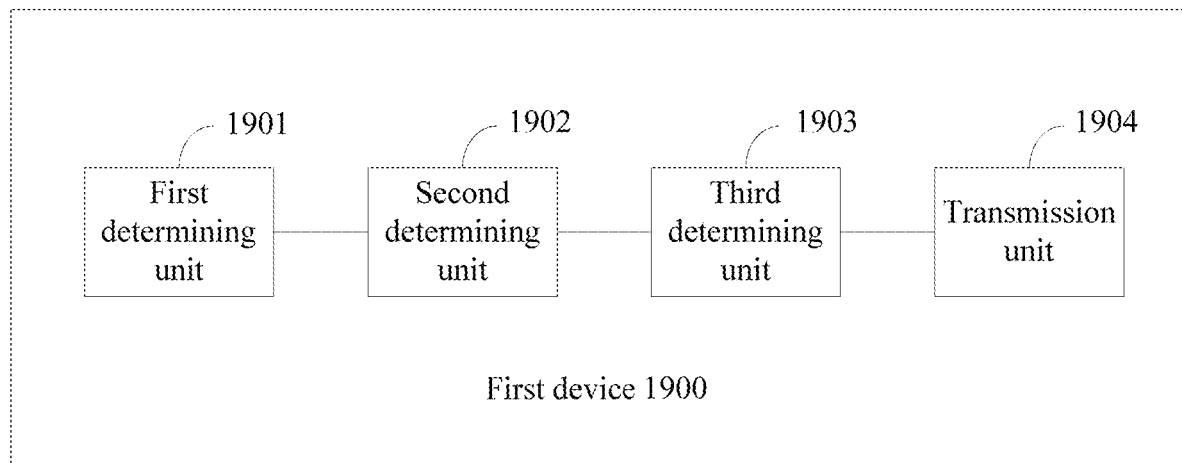
FIG. 19 is a functional block diagram of a first device disclosed in an embodiment of this application.

FIG. 19 is a functional block diagram of a first device. The first device 1900 includes a first determining unit 1901, a second determining unit 1902, a third determining unit 1903, and a transmission unit 1904.

The first determining unit 1901 is configured to determine to-be-transmitted system bits and a first time unit.

The second determining unit 1902 is configured to determine, based on the first time unit, a redundancy version corresponding to the first time unit.

The third determining unit 1903 is configured to determine first data based on the redundancy version and the to-be-transmitted system bits.

The transmission unit 1904 is configured to transmit the first data to the second device in the first time unit.

It should be noted that the foregoing functional units are further capable of performing some or all of the corresponding methods described in the foregoing method embodiments. For a hardware structure on which the foregoing functional units are based, refer to the embodiment shown in FIG. 15. Details are not described herein again.

Figure 20:
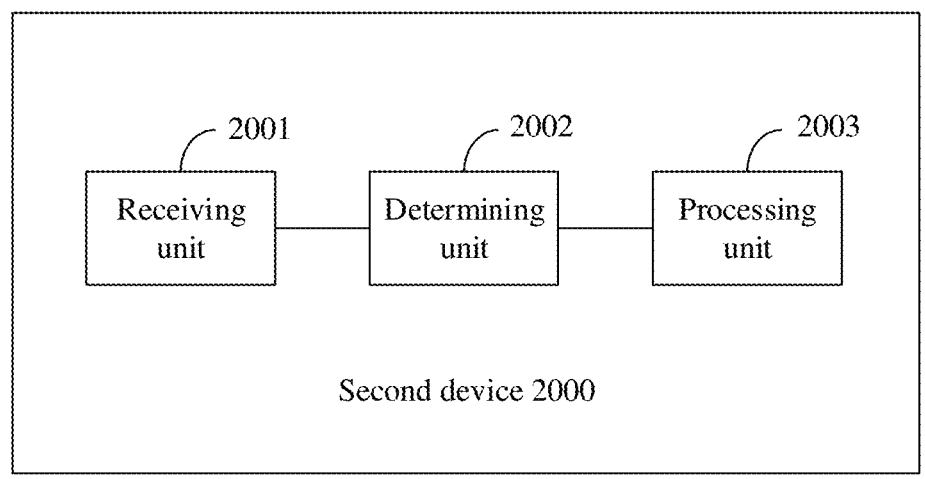
FIG. 20 is a functional block diagram of a second device disclosed in an embodiment of this application.

FIG. 20 is a functional block diagram of a second device. The second device 2000 includes a receiving unit 2001, a determining unit 2002, and a processing unit 2003.

The receiving unit 2001 is configured to receive, in a first time unit, first data transmitted by a first device.

The determining unit 2002 is configured to determine, based on the first time unit, a redundancy version corresponding to the first time unit.

The processing unit 2003 is configured to process the first data based on the redundancy version.

It should be noted that the foregoing functional units are further capable of performing some or all of the corresponding methods described in the foregoing method embodiments. For a hardware structure on which the foregoing functional units are based, refer to the embodiment shown in FIG. 16. Details are not described herein again.

In conclusion, an above-described manner of determining repeated transmission of data corresponding to system bits can ensure high reliability and a low latency of data transmission.

A person of ordinary skill in the art may understand that all or some of the procedures of the methods in the foregoing embodiments may be implemented by a computer program instructing relevant hardware. The program may be stored in a computer readable storage medium. When being executed, the program may include the procedures of the foregoing method embodiments. The foregoing storage medium includes various media that can store program code, such as a ROM, a random access memory RAM, a magnetic disk, or an optical disc.

What is claimed is:

1. A method, comprising:
repeatedly transmitting, by a first device, first data to a second device within a first time unit set, wherein the first data is determined based on a first redundancy version and to-be-transmitted system bits, the first time unit set comprises K time units, K≥3, and K is an integer; and
when a first condition is met, stopping, by the first device, transmitting the first data in an $M^{th}$ time unit, wherein 2≤M≤K, and M is an integer;
wherein the first data that is repeatedly transmitted prior to stopping, by the first device, transmitting the first data in the $M^{th}$ time unit is determined based on a same first redundancy version and same to-be-transmitted system bits.

2. The method according to claim 1, wherein before repeatedly transmitting, by the first device, the first data to the second device within the first time unit set, the method further comprises:
when a second condition is met, determining, by the first device, to repeatedly transmit the first data;
wherein the second condition comprises:
the first device receives configuration information from the second device, and the first device determines to repeatedly transmit the first data, wherein the configuration information corresponds to a transmission resource of the first device; or
the first device determines that a transmission code rate used for transmitting the system bits is greater than a first threshold, and the first device determines to repeatedly transmit the first data.

3. The method according to claim 1, wherein the first condition comprises:
the first device receives first feedback information that corresponds to the first data and that is from the second device, wherein the first feedback information indicates a reception status of the first data, and the reception status of the first data comprises correct reception, incorrect reception, or reception; or
a quantity of times the first device has repeatedly transmitted the first data to the second device reaches a second threshold.

4. The method according to claim 1, wherein:
the first condition comprises:
the first device receives first feedback information that corresponds to the first data and that is from the second device, wherein the first feedback information indicates a reception status of the first data, and the reception status of the first data comprises incorrect reception or reception; or
a quantity of times the first device has repeatedly transmitted the first data to the second device reaches a second threshold; and
wherein after the stopping, by the first device, transmitting the first data in the $M^{th}$ time unit, the method further comprises:
repeatedly transmitting, by the first device, the system bits to the second device within a second time unit set, wherein the second time unit set comprises the $M^{th}$ time unit to a $K^{th}$ time unit.

5. The method according to claim 4, wherein repeatedly transmitting, by the first device, the system bits to the second device within the second time unit set comprises:
transmitting, by the first device, second data in an $N^{th}$ time unit in the second time unit set, wherein the second data is determined based on a second redundancy version and the system bits, and N is a positive integer.

6. The method according to claim 5, wherein the first redundancy version is the same as the second redundancy version, or the first redundancy version is different from the second redundancy version.

7. The method according to claim 1, wherein a version number of the first redundancy version is 0.

8. A method, comprising:
receiving, by a second device within a first time unit set, first data repeatedly transmitted by a first device, wherein the first data is determined based on a first redundancy version and to-be-transmitted system bits, the first time unit set comprises K time units, K≥3, and K is an integer; and
when a first condition is met, stopping, by the second device, receiving the first data in an $M^{th}$ time unit, wherein 2≤M≤K, and M is an integer;
wherein the first data that is repeatedly transmitted prior to stopping, by the second device, receiving the first data in the $M^{th}$ time unit is determined based on a same first redundancy version and same to-be-transmitted system bits.

9. The method according to claim 8, wherein before receiving, by the second device within the first time unit set, the first data repeatedly transmitted by a first device, the method further comprises:
sending, by the second device, configuration information to the first device, wherein the configuration information instructs the first device to repeatedly transmit the first data.

10. The method according to claim 8, wherein after receiving, by the second device within the first time unit set, the first data repeatedly transmitted by the first device, the method further comprises:
when confirming that the first data is received, sending, by the second device to the first device, feedback information that corresponds to the first data, wherein the feedback information indicates that the first data is received.

11. The method according to claim 10, wherein confirming, by the second device, that the first data is received comprises:
confirming, by the second device based on signature information of the first data, that the first data is received.

12. The method according to claim 11, wherein the signature information comprises a demodulation reference signal or preamble information.

13. A first device, comprising:
a transmitter;
a processor; and
a computer-readable storage medium storing a program to be executed by the processor, the program including instructions for:
repeatedly transmitting, using the transmitter, first data to a second device within a first time unit set, wherein the first data is determined based on a first redundancy version and to-be-transmitted system bits, the first time unit set comprises K time units, K≥3, and K is an integer; and when a first condition is met, stopping to transmit the first data in an $M^{th}$ time unit, wherein $2 \leq M \leq K$, and M is an integer;

wherein the first data that is repeatedly transmitted prior to stopping, by the first device, transmitting the first data in the $M^{th}$ time unit is determined based on a same first redundancy version and same to-be-transmitted system bits.

14. The first device according to claim 13, wherein the program further includes instructions for:

when a second condition is met, determining to repeatedly transmit the first data, wherein the second condition comprises:

configuration information is received from the second device, and the first device determines to repeatedly transmit the first data, wherein the configuration information corresponds to a transmission resource of the first device; or it is determined that a transmission code rate used for transmitting the system bits is greater than a first threshold, and it is determined to repeatedly transmit the first data.

15. The first device according to claim 14, wherein the transmission code rate is determined based on a quantity of the system bits, a quantity of occupied resources corresponding to the system bits, and a modulation scheme, and the first threshold is a code rate of channel coding corresponding to the system bits.

16. The first device according to claim 13, wherein the first condition comprises:

first feedback information that corresponds to the first data and that is from the second device is received, wherein the first feedback information indicates a reception status of the first data, and the reception status of the first data comprises correct reception, incorrect reception, or reception; or a quantity of times of the first data being repeatedly transmitted to the second device reaches a second threshold.

17. The first device according to claim 13, wherein:

the first condition comprises:

the first device receives first feedback information that corresponds to the first data and that is from the second device, wherein the first feedback information indicates a reception status of the first data, and the reception status of the first data comprises incorrect reception or reception; or a quantity of times the first device repeatedly transmits the first data to the second device reaches a second threshold; and wherein the program further includes instructions for:

repeatedly transmitting the system bits to the second device within a second time unit set, wherein the second time unit set comprises the $M^{th}$ time unit to a $K^{th}$ time unit.

18. The first device according to claim 17, wherein the program includes instructions for:

transmitting second data in an $N^{th}$ time unit in the second time unit set, wherein the second data is determined based on a second redundancy version and the to-be-transmitted system bits, and N is a positive integer.

19. The first device according to claim 18, wherein the first redundancy version is the same as the second redundancy version, or the first redundancy version is different from the second redundancy version.

20. The first device according to claim 13, wherein the first redundancy version is an RV 0.

* * * * *